INVENTORS.
NORBERT C. KOLELL
THOMAS B. BULLOCK
BY
Wolfe, Hubbard, Voit & Osann
ATTORNEYS.

INVENTORS.
NORBERT C. KOLELL
THOMAS B. BULLOCK
BY
Wolfe, Hubbard, Voit & Osann
ATTORNEYS.

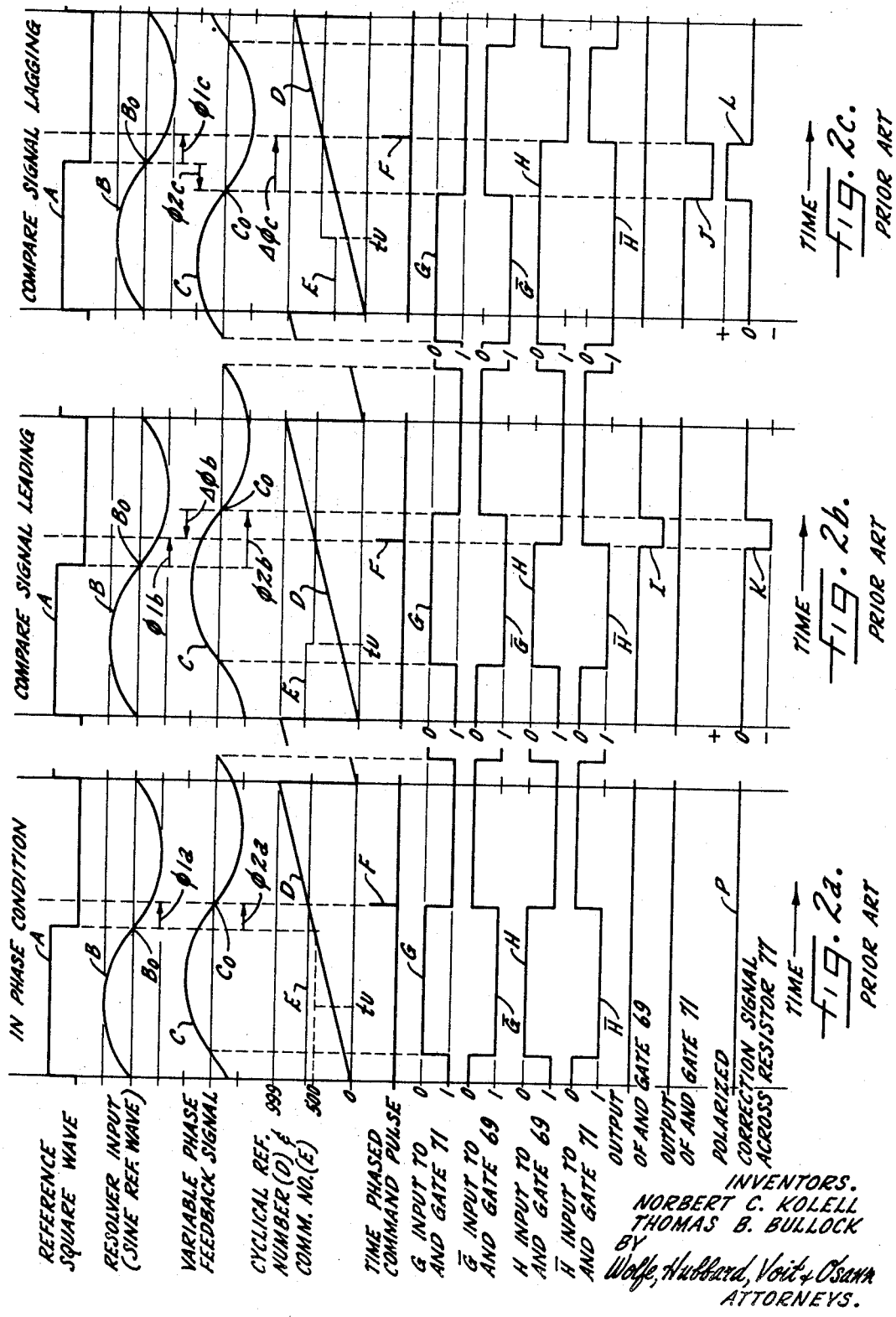

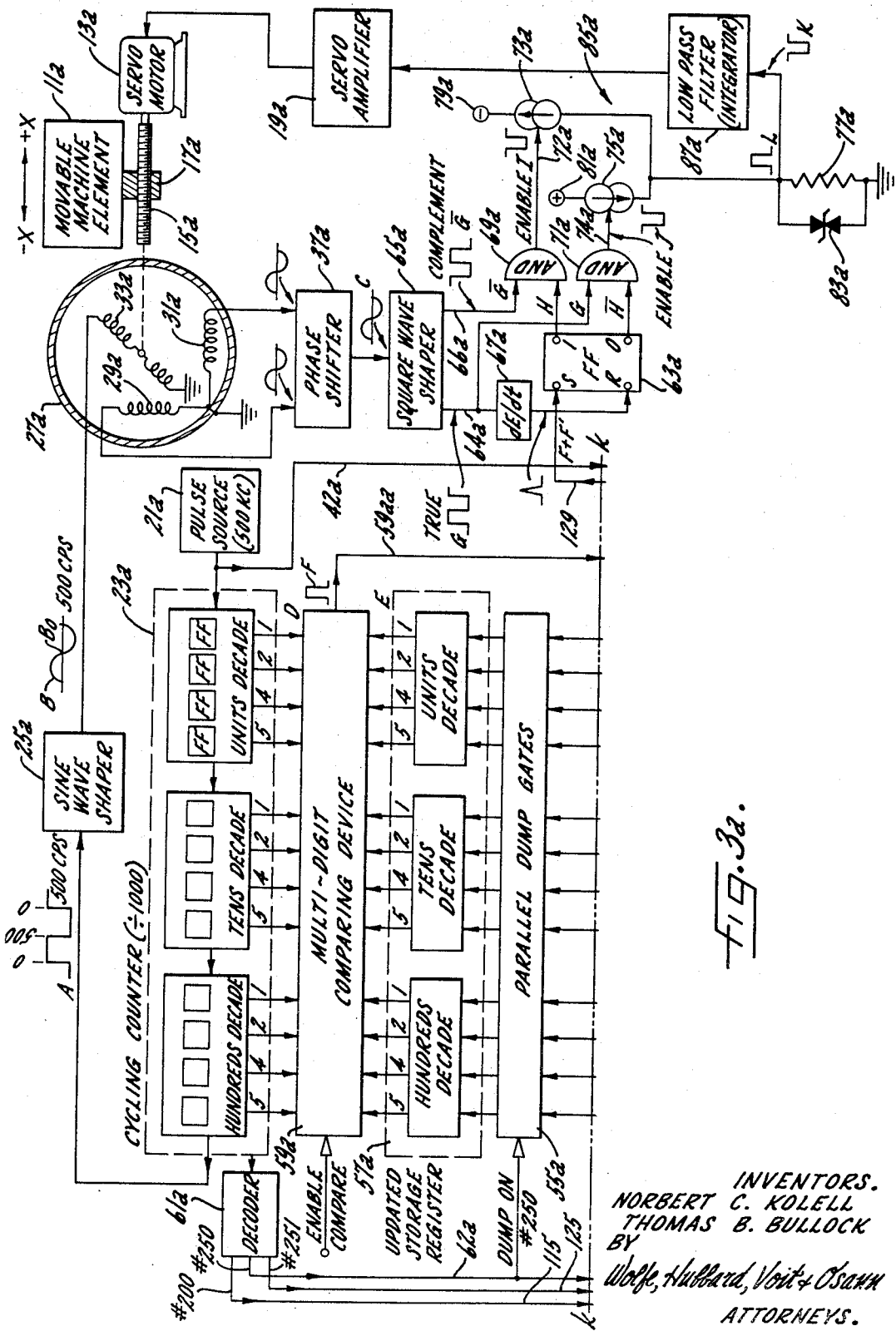

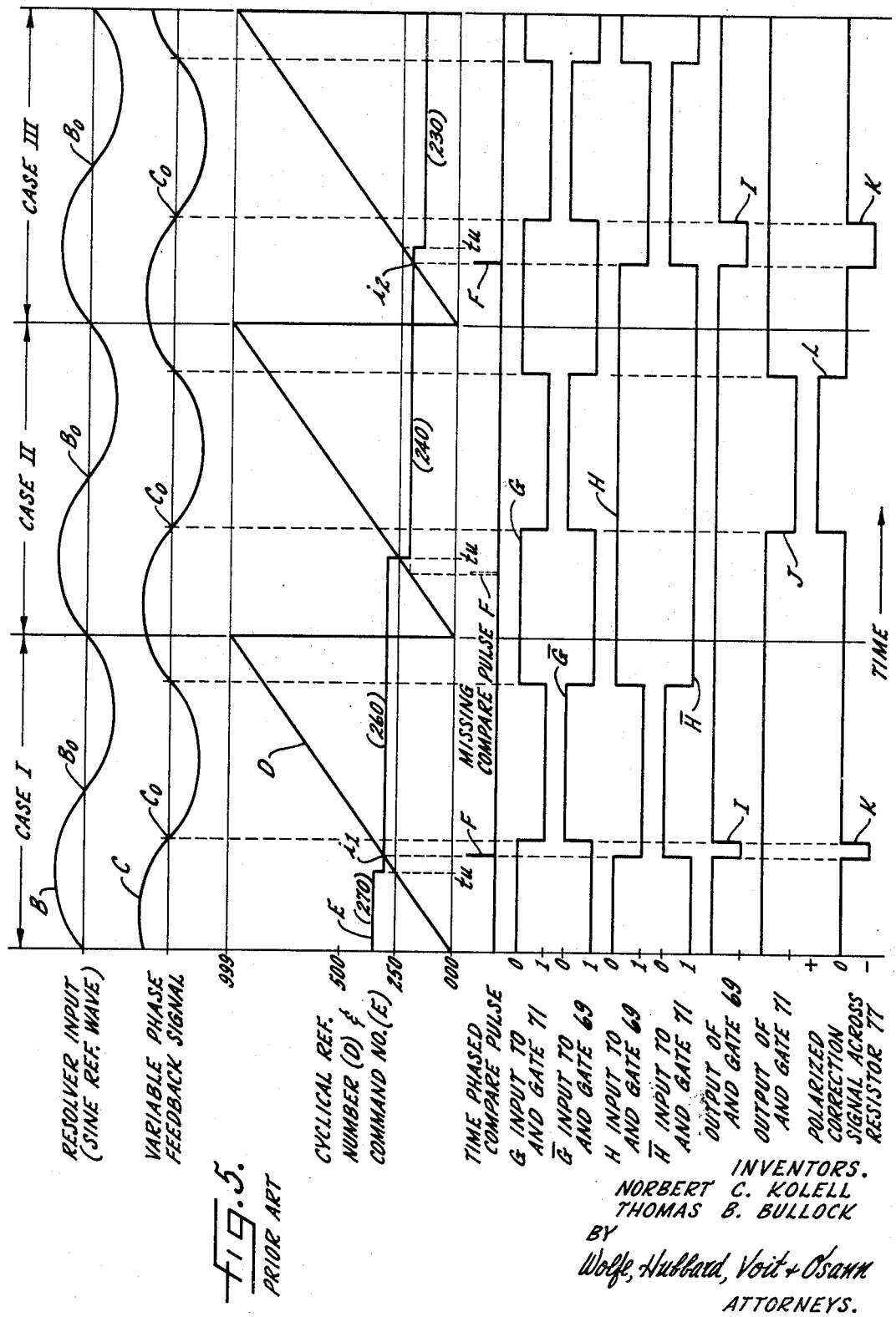

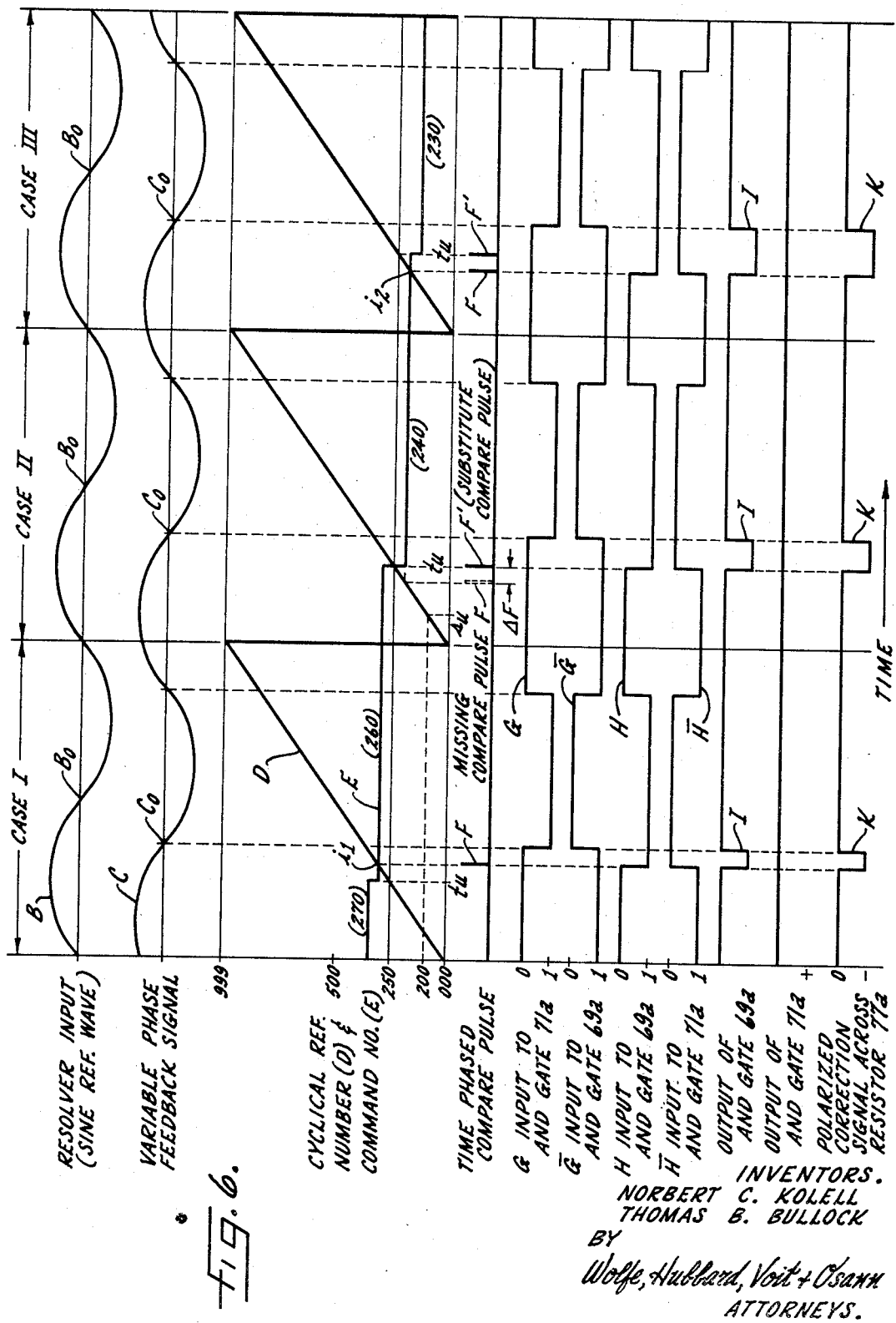

United States Patent Office 3,490,017
Patented Jan. 13, 1970

3,490,017
NUMERICAL CONTROL SYSTEMS EMPLOYING CONVERSION OF CHANGING COMMAND NUMBERS INTO PHASE ANALOG SIGNALS
Norbert C. Kolell, Empire, and Thomas B. Bullock, Fond du Lac, Wis., assignors to Giddings & Lewis Machine Tool Company, Fond du Lac, Wis., a corporation of Wisconsin
Filed Dec. 19, 1966, Ser. No. 603,030
Int. Cl. H04l 3/00; H03k 13/00
U.S. Cl. 340—347    11 Claims

ABSTRACT OF THE DISCLOSURE

A numerical control system wherein a phase-variable analog signal is created and utilized by a servo drive to control the displacement and velocity of a movable element in accordance with the extent of change and average rate of change of a periodically updated, digitally signalled command number, as disclosed in copending application Ser. No. 555,048; and characterized by an improvement for eliminating "misses" in the phase-variable signal which may result from "leapfrogging" under certain circumstances. A command number in a storage register is periodically updated. It is compared with a reference number signalled by a continuously running counter and which cycles between two values in phase agreement with a reference wave. At the instants during each cycle when the command number and reference number are equal, a compare pulse is created which by its phase, relative to the reference wave, corresponds to the command number. But in those cases where updating of the command number makes it "leapfrog" to a value already traversed by the reference number in a given cycle of the latter, and so that no equal comparison can occur during that cycle, the improved apparatus senses this and generates a substitute pulse closely timed to that which the "missed" pulse would have had, so that the compare pulses plus the substitute pulses form a phase-variable signal without discontinuities and thus provide smoother and more precise operation of the servo drive.

TABLE OF CONTENTS

|  | Column |
|---|---|
| Abstract of Disclosure | 1 |
| A. The Prior Art McGee System | 2 |
|   A1. The Feedback Signal | 2 |
|   A2. The Dynamically Changing Command Number | 4 |
|   A3. The Cyclically Changing Reference Number | 7 |
|   A4. Time Phased Command Signal Produced by Digital Comparison | 8 |
|   A5. Updating the Command Number | 10 |
|   A6. The Phase Error Signal | 10 |
| B. The Reasons for and Consequences of "Leapfrogging" | 14 |
| C. Exemplary Embodiments of the Invention | 16 |
|   C1. A Modified Form of Apparatus | 20 |
|   C2. Summary of Operation (FIG. 6) | 21 |

The present invention relates in general to numerical control systems for machine tools and the like and, although it is susceptible of use in point-to-point positioning systems, it will find especially advantageous application in continuous path or contouring control systems. More particularly, the invention relates to improvements in systems of the type disclosed and generically claimed in the copending application of John K. McGee, Ser. No. 555,-048, filed June 3, 1966 and assigned to the assignee of this application. In such systems, movable elements are translated through distances, in directions, and at velocities which correspond respectively to the amount, sense, and average rate of change of periodically changed digital command numbers by converting the latter into corresponding phase analog variations which, in turn, are utilized to control the displacements and velocities of the elements.

It is the general aim of the invention to improve the smoothness and dynamic accuracy in control systems of the genus disclosed in the above-identified copending McGee application by eliminating the effects of "leapfrogging" (such term being hereinafter explained).

An important object of the invention is to eliminate slight temporary changes in the error signals produced in a system of the above character, and which have been found to occur when the movable element controlled by the system is commanded to move in a given one of two directions along an axis.

Stated more specifically, it is another object of the invention to detect when one of the pulses in a train of variable phase pulses may be absent due to a "missed" comparison of an updated command number and a cyclically changing reference number in any given cycle of the latter, and to compensate for such absence by injecting a substitute pulse into the train.

Still another object is to provide such a system in which the "leapfrogging" is overcome by creating substitute pulses under certain conditions, but wherein the substitute pulses have no adverse effect on the operation of the system if one of the normal pulses in the phase-variable train is not absent.

Other objects and advantages will become apparent as the following description proceeds, taken in conjunction with the accompanying drawings, in which:

FIGS. 1a and 1b when joined along the indicated junction lines J—J constitute a diagrammatic block and line illustration of a prior art control system upon which the present invention is an improvement;

FIGS. 2a, b and c illustrate the time relationships of signals in the prior art system under three different conditions;

FIGS. 3a and 3b, when joined along the indicated junction line K—K, constitute a diagrammatic block and line illustration of a control system embodying the improvement features of the present invention;

FIG. 5 is a graphical representation showing the time relationships of signals in the prior art system during three successive time periods; and FIG. 6 is a graphical representation showing the time relationships of signals in the system incorporating the improvement features of the present invention during successive time periods under conditions similar to those which are represented in FIG. 5.

Figure 1A:
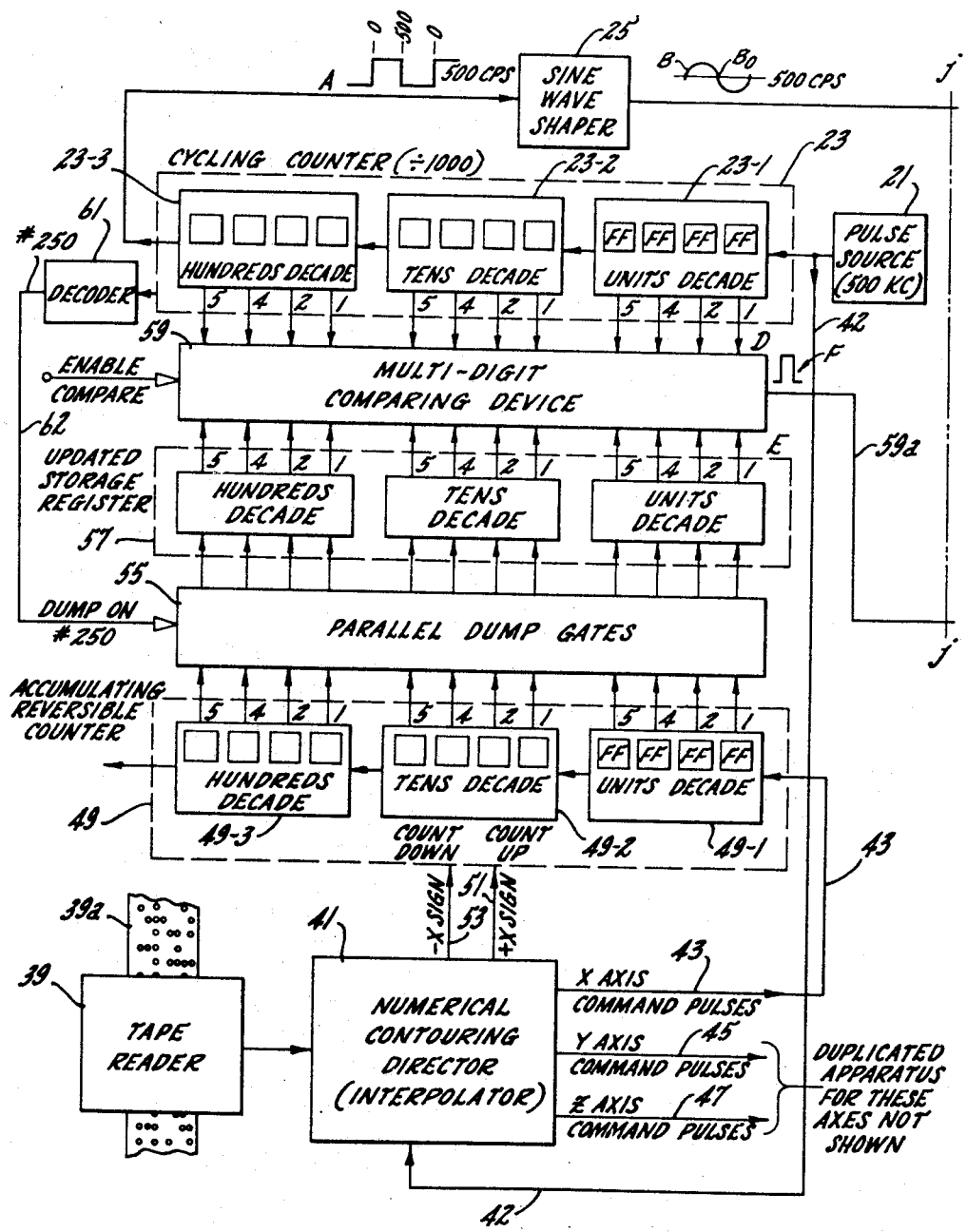

While the invention has been shown and will be described in some detail with reference to preferred embodiments thereof, there is no intention that it thus be limited to such detail. On the contrary, it is intended to cover here all modifications, alternatives, and equivalents falling within the spirit and scope of the invention as defined by the appended claims.

(A) The prior art McGee system

Familiarity with the system disclosed in the above-identified McGee application is desirable before an understanding of the improvement brought forth by the present invention is attempted. Accordingly, before describing the present invention, the McGee system will be described in detail under headings which correspond generally to those found in the copending McGee application.

(A1) The feedback signal

The numerical control system shown in FIG. 1 includes a servomechanism for translating a movable element according to numerically defined commands. The movable element 11 is translated through distances and at velocities corresponding to the numerically defined commands by appropriate energization of a reversible servomotor 13 connected to turn a lead screw 15. Engaged with the lead screw and fixed to the element 11 is a nut 17. The element 11 is moved in a $-x$ or $+x$ direction (toward the left or toward the right in FIG. 1) and at speeds corresponding to the magnitude and polarity of a DC voltage applied to the servomotor 13 by a servoamplifier 19. The manner in which the signal for driving the servoamplifier 19 is created will be described hereinafter.

Stated briefly, a comparison is made between the instantaneous position of the movable element 11 and a signal representing the directed, instantaneous, and dynamically changing position of the element. Based on this comparison an error signal is produced whose sense and magnitude correspond to the sign and extent of the error which exists between the instantaneous directed and actual positions of the element. In this manner, the velocity of the element is made to correspond to the rate of change in the commanded or directed instantaneous position.

Provision is made to generate a feedback signal whose phase relative to a reference signal, or relative to the recurring count of a cycling counter, is indicative of the actual instantaneous position of the movable machine element 11. In the exemplary arrangement shown, the output pulses from a constant frequency pulse source 21 are divided by some factor by a cycling count 23 to produce a reference wave A at a second, lower frequency. The frequency of the pulse source may be assumed to be 500 kiloHertz and the scale or count capacity of the cycling counter 23 is 1000 so that a recurring reference square wave A of 500 cycles per second appears at its final "carry" output.

By means of a sine waves shaper 25 the 500 c.p.s. square wave A is converted into a recurring 500 c.p.s. sinusoidal reference signal B which is preferably in phase with the square wave signal A. However, it will not detract from the operation of the system if the conversion introduces a constant phase angle between the two recurring waves A and B.

To provide an indication of the actual instantaneous position of the movable element 11, means are provided for producing a recurring feedback signal which is indicative by the sense and magnitude of its phase angle, relative to the reference signal B, of the sign and extent of the displacement of the movable element from a datum position. Synchronous induction devices having two relatively movable parts are particularly suitable for this purpose, the one here shown is a resolver 27 having a stator with stator windings 29 and 31 associated with a rotor carrying a rotor winding 33. The resolver rotor is mechanically coupled through suitable gearing (not shown) to the lead screw 15, so that as the latter is turned by the servomotor 13, the resolver rotor turns with it. As a specific example, the resolver rotor may be geared to the lead screw 15 so that it makes one revolution for each 0.1 inch of travel by the movable element 11.

The resolver 27 is excited by the sinusoidal reference signal B fed to its rotor winding 33. The resulting pulsating magnetic field induces a pair of sinusoidal signals in the stator windings 29 and 31 with the amplitude of the output signals varying as sine and cosine functions of the angular position of the stator windings with respect to the rotor winding 33.

By means of a phase shifter 37 the variable amplitude sinusoidal signals appearing across the resolver stator windings 29 and 31 are converted into a single sinusoidal signal C which is of constant amplitude but whose phase relative to that of the sinusoidal reference signal B shifts 360° with each complete rotation of the resolver rotor. Such phase shifters are well known in the art, a suitable example being disclosed in Fitzner United States Patent 3,215,915. In the illustrated example, for each 0.1 inch movement of the machine element 11, the resolver rotor winding 33 is rotated 360° so that with each such movement of the element the feedback signal C is shifted by 360° relative to the reference signal B. As the machine element 11 continues to move, the feedback signal C is brought into phase with the reference signal B at successive "datum" positions spaced 0.1 inch apart. When the element 11 is moved to the left or to the right of such a datum position, the sense and magnitude of the phase angle $\phi 2$ between the mid-cycle points of the feedback signal C and the reference signal B reflects the sign and extent of the displacement of the element from that datum position. The particular locations of the datum along the path of travel at which the feedback wave C is in phase with the reference wave B may be adjusted by physically turning the stator of the resolver 27 and then re-locking it in place.

The phase relationships just described are illustrated in FIGS. 2a–c. In FIG. 2a the feedback signal C lags the reference wave B by a small angle $\phi_{2a}$ indicating that the movable element 11 is on one side, say to the right, of one of the datum points. In FIG. 2b the feedback signal C lags the reference wave B by a larger angle $\phi_{2b}$, indicating that the element 11 is further away from the datum position compared to the case illustrated by FIG. 2a. FIG. 2c illustrates the relatives phases of the feedback signal C and the reference wave B when the movable element 11 is on the opposite side of a datum position from that illustrated in FIGS. 2a and 2b. In such a case the feedback signal C leads the reference wave B by an angle $\phi_{2c}$.

(A2) The dynamically changing command number

The overall purpose of the system is to control the movable element 11 such that the extent, direction, and velocity of its movement respectively agree with the amount of change, sense of change, and rate of change of a dynamically changing, digitally represented command number which, by its instantaneous value indicates the desired instantaneous position of the element. FIG. 1 illustrates in diagrammatic form a typical arrangement for producing such a digitally represented command number.

In numerical control systems for machine tools, it is common practice to control the simultaneous motions of a plurality of elements movable along a plurality of axes so as to produce resultant increments of motion between a workpiece and cutting tool of desired lengths and at different angles in space. As illustrated in FIG. 1, a tape reader 39 is arranged to read numerical programmed information (one block at a time) from a punched tape 39a and to supply its output signals to a numerical contouring director 41 which also receives input pulses from the source 21 via a line 42. Multi-axis numerical contouring directors such as that represented at 41 are well known in the art and need not be described here in detail. It will suffice simply to note that the director functions to produce trains of command pulses on lines 43, 45, 47 for X, Y and Z axes of movement. Such command pulses for a given axis each represent a given increment of commanded motion (e.g., .0001"), and thus by their total number and their frequency respectively represent a desired extent of movement and a desired velocity of movement along that axis. By coordinating the number and frequency of command pulses for the X, Y and Z axes, the axis component distances and velocities will result in combined motion of a desired extent and at a desired angle in space.

The element 11 shown in FIG. 1 is assumed to be movable along the X axis, and the manner in which it is controlled in response to command pulses produced by the director 41 on line 43 will be explained in detail below. Because the apparatus for controlling elements movable along the Y and Z axes may be substantially like that here illustrated for the X axis, only the latter is shown in detail.

The director 41 receives sign information from the tape reader 39 and indicates by signals on lines 51 or 53 whether the motion directed by command pulses on line 43 is to be in a positive or negative direction (+x to the right and −x to the left as illustrated adjacent the movable element 11). Moreover, it may be assumed that each of the command pulses on line 43 is non-coincident in time with any of the pulses produced by the source 21.

The command pulses on line 43 are serially spaced in time. To convert them into a digitally signalled command number which changes at a rate proportional to the command pulse frequency, such pulses are applied to the input of an accumulating reversible counter 49. In the illustrative embodiment, the reversible counter 49 has three cascaded decades, the units decade 49–1, the tens decade 49–2, and the hundreds decade 49–3 for storing the units, tens, and hundreds digit of a number, respectively. The counter is also provided with COUNT UP and COUNT DOWN control terminals connected to the sign-signalling lines 51 and 53.

Formed of four cascaded flip-flops interconnected by appropriate gates, each decade signals its stored digit on four output lines in binary-coded-decimal notation. It is assumed that each decade signals the decimal digit "count" stored in it in the 5421 code. According to this code, signals appearing on the four output lines of each decade are respectively assigned a weight of 5, 4, 2, and 1, and decimal numbers from 1 to 9 are represented by signals appearing on one or more lines whose total weight equals the signalled number. Of course, other binary decimal codes may be used, and the 5421 code here described is merely exemplary.

With the COUNT UP input terminal 51 energized, each input pulse adds one to the number signalled at the output lines of the units decade counter 49–1. Upon every tenth input pulse, the units decade counter 49–1 feeds one pulse to the tens decade counter 49–2 and upon every hundredth input pulse, the tens decade counter 49–2 steps the hundredth decade counter 49–3 by one. Each of the three decade counters resets itself upon the tenth pulse it receives so that the total capacity of the three-decade counter 49 is 999 with the total number of accumulated pulses being represented in binary coded decimal notation by a unique combination of signals on the twelve counter output lines.

To reverse the operation of the reversible counter 49, its COUNT DOWN control terminal 53 is energized, causing the counter to diminish the number signalled at its output terminals by one for each pulse fed to its input.

The number signalled to the outputs of the accumulating reversible counter 49 represents the commanded instantaneous position of the movable element 11 along the X axis and the rate at which the signalled number changes represents the directed velocity of the element. To translate the element 11 in a +x direction at a given velocity, the number signalled by the reversible counter 49 is increased by an amount and at a rate which corresponds to the desired distance and velocity of the element. Similarly, if it is desired to translate the element in a −x direction, the number signalled by the counter is diminished by a corresponding amount and at a corresponding rate. Accordingly, when the numerical contouring director 41 is informed by the tape reader 39 that the element 11 is to be translated in the +x direction at a given velocity, the director feeds a +x signal via line 51 to the COUNT UP terminal of the accumulating reversible counter 49 and feeds a series of X axis command pulses to the counter through the line 43, the number of pulses representing the distance to be moved in the +x direction and the pulse repetition rate representing desired velocity.

Assuming, for the sake of example, that each X axis command pulse represents a directed movement of 0.0001 inch, a +x movement of 1.0 inch at a rate of 2 inches per second would be signalled by 10,000 X axis command pulses fed to the accumulating reversible counter 49 at a rate of 20 kiloHertz. The counter 49 would thus theoretically increase its stored and signalled count by 10,000, but since it signals only the three lowest order digits, the command number digitally signalled in 5421 code on its twelve output lines will increase from 000 to 999, and then repeat such counting nine more times, finally ending on 000. Thus, while the total capacity of the accumulating reversible counter 49 is only 999, the total number of X axis command pulses received may well be in excess of this amount. In effect, if the total number of X axis command pulses represent a command number, the accumulating reversible counter signals only the three least significant digits of the command number. For reasons which will become apparent as this description proceeds, this portion of the total command number is sufficient for proper operation of the system.

When the command pulses on line 43 represent motion in a negative direction, and the line 53 supplies an enabling signal to the COUNT DOWN terminal, the counter 49 simply counts in a reverse sense, so that the command number signalled on its twelve output lines decreases by one in response to each command pulse. It will thus be seen that the counter 49 signals in digital, binary decimal code a command number which changes in a sense and at a rate corresponding to a desired direction and velocity of motion for the element 11.

In the apparatus as thus far described, the command number digitally signalled by the reversible counter 49 changes in uniform increments of one and at different rates which depend upon the frequency of the received command pulses. For a reason which will become apparent rates which depend upon the frequency of the received command pulses. For a reason which will become apparent hereinafter, it is desirable to signal the changing command number with a different type of variation, and specifically such that it is periodically updated no oftener than once during each cycle of the reference wave B (i.e., once during each cycle of the reference counter 23). For this purpose, the signals on the twelve output lines of the accumulating counter 49 are periodically dumped in parallel through dump gates 55 into the corresponding bit storage devices of a three-decade updated storage register 57. Although such dumping action may be triggered by clocked timing signals, the exemplary arrangement of FIG. 1 includes a decoder 61 coupled to the reference counter 23 and arranged to produce an output signal on a line 62 each time that counter contains a predetermined count, here assumed to be 250. That output signal is applied to an "enable" terminal of the dump gates 55 and causes the latter to momentarily "open," so that the contents of the counter 49 will be transferred in parallel to the storage register 57. Thus, if the counter 49 signals the decimal number 467 at the instant the dump gates open, the storage register will be set to hold the number 467 and to digitally represent such number in 5421 binary decimal code by signals on its twelve output lines.

The command number digitally signalled on the storage register output lines is thus one which dynamically changes. However, it changes at time instants spaced no closer that the period of the reference wave B; or in other words it changes 500 times a second, and in particular at each instant that the reference counter passes through a count of 250. This will be called the "update instant" within each cycle of the counter 23. The amount of change in the command number at each "updating" depends upon how much the count in the counter 49 has changed since the previous updating. Thus, the command number digitally signalled by the output of the storage register 57 is in the present instance changed or updated at uniformly spaced time instants, but the sense of the change and the average rate of the change correspond to the sign of the commanded movement and commanded velocity of movement. The updating occurs so frequently (e.g., 500 times per second) that the amount of each change in the represented command number cannot be excessive even when the director command pulses call for the maximum programmable velocity of the element 11.

The updated, dynamically changing command number may be derived from any suitable source, and the illustration of a director 41 producing command pulses which are received in the accumulating counter 49 is intended only to represent one example.

(A3) The cyclically changing reference number

Provision is also made to the produce signals digitally representing a reference number which during successive time intervals repeatedly and cyclically changes in small uniform increments from a first to a second predetermined value. The signalled reference number itself thus undergoes successive cycles of variation, relative to which a repeating signal may vary in phase. In the preferred form of the system, the reference number uniformly changes by small increments from one value to another during each cycle of the reference wave B. The reference number thus cyclically changes from a first value to a second value by uniform increments spaced by uniform short time periods during each cycle of the reference wave; and in synchronism (equal cycle intervals and constant phase) with that wave.

More particularly, means are provided to produce binary coded decimal signals which change to signal a reference number that increases or decreases linearly in uniform steps at uniform time intervals during each cycle of the reference wave B. The reference number thus cyclically increases from a minimum value (e.g., 000) to a maximum value (e.g., 999) and then repeats, in synchronism with the reference wave B. In effect, therefore, each increment of the reference number corresponds to one time portion of a cycle of the reference wave, the latter being divided up into many small time intervals equal in number to the number of counts or increments in the reference number variation.

The cyclically varied reference number, synchronized with the reference wave B, may be digitally signalled by the same reference counter 23 which divides the pulses from the source 21 to produce the reference wave B. Thus, because the three-decade reference counter 23 receives 500 kiloHertz pulses from the source 21, it will repeatedly and cyclically count from a decimal number content of 000 to 999 five hundred times a second. The counter 23 is constituted by a units, a tens, and a hundreds decade 23–1, 23–2 and 23–3 connected in tandem, each decade containing four flip-flops interconnected by gating (not shown) so that it repeatedly counts from 0 to 9 and signals its contents on four ouput lines in 5421 binary code.

With each series of 1000 pulses from the pulse source 21, the cycling counter 23 is successively stepped through 1000 different states from 000 to 999 during each of which the counter signals on its twelve output lines in the 5421 binary decimal code the number of pulses which it has received. The thousandth pulse resets counter 23 to 000 so as to be begin the signalling at its output of a new series of 999 increasing numbers. And, as noted above, the counter 23 is stepped through its complete cycle once during each cycle of the reference signal B. The "phasing" of the cycling count and the reference signal B is immaterial so long as it is constant. That is, the count of the 1000 count capacity counter 23 might be, for example, 150 at the instant the reference wave B begins a cycle, 650 at an instant midway through that cycle (when the negative-going zero crossing B occurs), and again 150 at the start of the next reference wave cycle. In the illustrated system, it is assumed for convenience of explanation that the reference square wave A is derived from the "carry" output of the last flip-flop of the hundreds decade 23–3 in the cycling counter 23, and that the square and simusoidal waves A and B are in phase with one another, so that the "count" of the counter is 000 when each cycle of the reference wave B begins, such count increases to 500 when the first half cycle of the wave B is complete (at the instant of the zero crossing $B_0$), and the count is returned to 000 at the start of the next cycle of the wave B. Thus, synchronism of the frequencies and a fixed time relationship between the cycles of the signalled reference number and the reference wave B is achieved by deriving the reference number signals and the reference wave B from the same counter 23.

As shown in the case of the units decade 23–1, each of the three decades of the cycling counter is made up of four flip-flops and, to generate a binary coded decimal 5421 code, the flip-flops are so interconnected by gates (in a manner known per se and therefore not shown) that the last flip-flop of each decade reverses its state after the fifth and tenth pulse received by the decade. Consequently, the last flip-flop of the hundreds decade 23–3 reverses its state after the five hundredth and one thousandth pulse fed to the counter 23 and after each five hundred subsequent pulses are fed to the counter. This makes the midpoint of each cycle of the reference wave B (here shown as a negative-going zero crossing $B_0$) coincide in time with the middle value (here 500) of the range through which the reference number cycles. It should be understood, however, that the count signaled by the counter may have any particular desired value (hereinafter called the reference mid-point value) at the instant the reference wave B reaches the mid-point $B_0$ of each of its cycles.

The phase relation here assumed between the reference square wave A, the reference wave B, and the number signalled by the cycling counter 23 is indicated in FIG. 2a by the positively sloped line D. The vertical scale to the left of the line D indicates that, during a complete cycle of the reference square wave A, the reference number D signalled by the cycling counter 23 increases from 000 to 999 at a uniform rate, and that the mid-point of the square wave A occurs at the instant when the cycling counter is just turning 500, the middle of its total range. The same relationships apply to the reference wave B, since it is assumed to be in phase with wave A. However, if the reference wave B happened to lag the wave A by a constant phase angle of 90°, then the reference mid-point value of the signalled changing number would be 750.

It will be apparent that instead of employing a counter which repeatedly counts up to produce signals representing a cyclically increasing reference number, a similar counter may be used to repeatedly count down and signal a cyclically decreasing reference number.

(A4) Time phased command signal produced by digital comparison

Provision is made to produce a repeating signal (called "compare signals") at each instant when the cyclically changing and digitally signalled reference number is equal to the periodically changing digitally signalled command number. In this way, the phase angle or phase modulation of the repeating signal varies in sign and magnitude (relative to the cycling intervals of the reference number signalled by the counter 23) according to the sense and extent of the changes in the command number. More specifically, the repeating signal is produced by comparing the cyclically changing reference number and the dynamically changeable command number, so that the phase angle of that repeating signal changes in sense and extent (relative to the recurring reference wave B, which is fixed in phase relative to the cycling intervals of the reference number) according to the sense and extent of the difference between (a) the mid-point value e.g., 500 as here described) of the cyclically changing reference changing reference signal and (b) the instantaneous value of the updated command number. Thus, the digital intelligence of the dynamically changing command number is converted into a corresponding phase analog variation, since the phase angle between the repeating signal and the reference wave changes by amounts, in a sense, and at an average rate which correspond respectively to the amount, sense and average rate of change of the command number.

As shown in FIG. 1, this comparison of two digitally represented but changing numbers is effected by connecting the twelve output lines of the cycling counter 23 and the twelve output lines of the updated storage register to the respective inputs of a fast-acting multi-digit comparing device 59. Binary coded decimal number comparators are per se well known to those skilled in the art, and thus it is not necessary to show or describe the details of the device 59. It will be helpful to note, however, that the comparing device operates to produce a compare signal F in the form of a short pulse on its output line 59a only when the reference number digitally represented in 5421 binary code on the output lines of the counter 23 is equal to the updated command number digitally represented in 5421 binary code on the output lines of the storage register 57.

Except in the special case treated below, at some value of the reference number during each cycle thereof (from 000 to 999) it will become equal to the digitally signalled command number because the latter, being a three-digit decimal number, will always fall with the range spanned by the cyclically changing reference number. Thus, a compare signal F will be produced at some instant during each cycle of the reference counter 23 and the train of pulses F recurring at a nominal rate of 500 per second will by their variation in phase, relative to the reference wave B, represent the corresponding changes in the command number. It would be possible of course, to cause the digitally signalled reference number to cycle between minimum and maximum values other than 000 and 999 here given by way of example. In that event, however, the dynamically changing, digitally signalled command number would be arranged so that its value always falls within such other maximum and minimum values.

The manner in which the compare signals F, i.e., the phase variable command signal, change in phase relative to the reference signal B is illustrated in FIGS. 2a, b, c. In these figures, the number held in the storage register 57 is represented by the horizontal lines E, and the instant of equal comparison is indicated by their intersections with the lines D representing the cyclically changing reference number.

Since the reference number D increases from its minimum to its maximum value once during each cycle of the reference signal B, the instant, or phase, during the cycle of the reference signal B when the compare signal F occurs is unambiguously determined by the amount to which the reference number D has increased when it becomes equal to the command number E. Hence, the phase of the compare pulse F with reference to the phase of the reference wave B is determined by the magnitude of the command number E, so that the compare signal F is itself a time phase command signal. Specifically, assuming that the reference signal B is positive during the first half of its cycle, the compare signal F is time-phased relative to the negative-going zero crossing of the reference signal B (shown in FIG. 2a as $B_0$) by an angle $\phi_1$ which in sign and magnitude corresponds to the sign and magnitude of the difference between the command number E and the mid-point value (here 500) of the reference number D. Thus, with a total range of 000 to 999 for the reference number D, the compare signal F will be exactly in phase with the negative-going zero crossing $B_0$ of the reference signal B, and the angle $\phi_1$ will be zero when the command number E is 500. For command numbers less than 500, the compare signal F will lead the negative-going zero crossing point $B_0$ and similarly for command numbers exceeding 500, the compare pulse F will lag $B_0$. If the command number is 400, then the compare signal will lead the crossing point $B_0$ by $$(400-500) \times \frac{360°}{1000} = -36°$$

whereas if the command number is 510, the compare signal will lag the crossing point $B_0$ by $$(510-500) \times \frac{360°}{1000} = +3.6°$$

This phase angle $\phi_1$ represents the commanded instantaneous position of the movable element 11 from the nearest datum point for the resolver 27. The phase variation of the compare signals F relative to the reference wave B may be utilized either directly in an open loop control system without feedback means, or the phase of the compare signals F may be converted into a variable DC voltage for application to an open loop condition-controlling actuator. However, as here shown, the compare signal is utilized in a closed loop phase-error control system as hereinafter described.

(A5) Updating the command number

To keep the position and velocity of the movable element 11 in conformance with that directed by the contouring director 41, the information in the storage register 57 is periodically updated, as previously explained, so that the comparison between the command number E and the reference number D may be made on the basis of "fresh" information. Although it is desirable to update the storage register 57 frequently, this must not occur more than once during each cycle of the reference signal, otherwise two mutually conflicting compare signals F might be generated during the same cycle of the reference wave B. Accordingly, no more than once during each cycle of the reference signal B a dump signal is applied via line 62 to the parallel dump gates 55 so as to bring the information in the storage register 57 up to date with the number stored in the accumulating reversible counter 49. The dump signal is conveniently derived from the cycling counter 23 by means of the decoder 61, typically a set of coincidence gates (not shown) having inputs connected to the output lines of the cycling counter 23 and arranged to produce a dump signal when the number D reaches a particular value at which updating of the storage register 57 is to occur.

In the system of FIG. 1, updating of the storage register 57 is indicated to occur when the reference number D is 250. With coincidence gates serving as the decoder 61, the storage register 57 is updated during each cycle of the reference signal B. This need not necessarily be so and less frequent updating may be attained by placing a pulse frequency divider between the decoder 61 and the dump gates 55 so as to bring the storage register 57 up-to-date during every second or every third cycle of the reference wave or even less frequently.

FIGURES 2b and 2c show two examples of updating, both at the same instant $t_u$ during the cycle of the reference signal B. In the example of FIG. 2b, the command number E is reduced by updating, while in the example of FIG. 2c the change is in the opposite direction. It is important to note that the instant of occurrence of the compare signal F is determined by the magnitude of the updated command number E.

(A6) The phase error signal

The time phased command signal F and the variable phase feedback signal C are caused to operate a single bistate device whose outputs are then used to produce a polarized error signal which is indicative of the magnitude and the sense of the error phase angle between the phase command and feedback signals. The bistate device, shown as a flip-flop 63, has two stable states which will be referred to as its "0" and "1" states. The flip-flop 63 is set into its "1" state at the instants when the reference number D becomes equal to the command number E by the compare signal F, fed to its "set" input terminal S from the output of the comparing device 59.

Means are also provided for resetting the flip-flop 63 into its "0" state at the instant of each positive-going zero crossing of the feedback signal C. The positive-going zero crossing signal for resetting the flip-flop is derived from the feedback signal C by means of a square wave shaping circuit 65. At one of its output terminals 64 the square wave shaper 65 produces a first square wave G which is in phase with the feedback signal C. The square wave G is fed to a unipolar differentiating circuit 67 whose output is connected to the reset input terminal R of the flip-flop 63. In response to each positive-going wave in front of the square wave G, and hence at the positive-going zero crossings of the feedback signal C, the differentiating circuit 67 produces a triggering pulse which resets the flip-flop.

The flip-flop 63 has a pair of output terminals labeled "1" and "0." When the flip-flop is in its "1" state, the "0" output produces a logic signal which is at the logical "0" level and the "1" output produces a logic signal at the logical "1" level. In the embodiment illustrated in FIG. 1, the logical "0" level is positive relative to the logical "1" signal level. When the flip-flop is reset into its "0" state, the logic signals at its outputs are reversed with a logical "1" signal appearing at the "0" output and a logical "0" signal appearing at the "1" output.

At a second output terminal 66, the square wave shaper 65 produces a complement of the square wave G, such complement being labeled $\bar{G}$. Thus, at all times, the square wave shaper produces at its two outputs a pair of bi-valued logic signals, one signal $\bar{G}$ being at a relatively low, binary logic "1" level during each positive half cycle of the feedback signal C and at a binary "0" level during each negative half cycle of the feedback signal. The other square wave signal G is at a low, binary logic "1" level during each negative half cycle and at a binary "0" level during each positive half cycle of the feedback signal (FIG. 2a).

In order to produce a polarized D.C. signal which is indicative of the sign and magnitude of the error phase angle between the feedback signal C and the compare signal F, the complement output G of the square wave shaper 65 and the "1" output H of the flip-flop 63 are applied to a first AND gate 69, and the G output of the square wave shaper 65 and the "0" output $\bar{H}$ of the flip-flop 63 are applied to a second AND gate 71.

The outputs of the AND gates 69 and 71 are connected to control terminals 72 and 74 of two current generators 73 and 75 respectively. The generators work into a common load resistor 77, but are oppositely poled so that when the negative current generator 73 is turned on, current flows from ground through the resistor 77 and through the generator 73 into a negative terminal 79 thus establishing a negative voltage across the resistor. Conversely, when the positive current generator 75 is turned on, current flows from a positive terminal 81 through the generator 75 and the resistor 77 into ground, causing a positive voltage to appear across the resistor. Regardless of which current generator is turned on, the size of the signal across the resistor 77 is kept at a predetermined magnitude by a bipolar Zener diode 83.

Thus, the two current generators 73 and 75, the resistor 77, and the bipolar Zener diode 83 operate as a single tri-state signal generating unit. Together with the gates 69 and 71 which control it, the tri-state generator constitutes means for producing a first type of error signal (negative voltage across resistor 77) during periods when the flip-flop 63 is in its "1" state and the feedback signal C is concurrently in a positive half cycle; and they also constitute means for producing a second type of error signal (positive voltage across resistor 77) during periods when the flip-flop 63 is in its "0" state and the feedback signal is concurrently in a negative half cycle. But if the command phase signals F are in phase with the positioning feedback signal C, then neither current generator 73 nor 75 is turned on, and no signal appears across the resistor 77.

When the compare signal F leads the negative-going zero crossing point $C_0$ of the feedback signal C, the first AND gate 69, controlled by the $\bar{G}$ and H signal outputs of the wave shaper 65 and the flip-flop 63 sets the tri-state signal generating unit 85 to its "negative on" state so as to produce a negative signal across the resistor 77 for a time interval which is directly proportional to the amount of the phase lead.

Similarly, when the compare signal F lags the point $C_0$, the second AND gate 71 under the control of the signals G and $\bar{H}$ sets the signal generating unit 85 to its "positive on" state, again for a time interval directly proportional to the amount of the phase lag.

The manner in which the square wave shaper 65, the flip-flop 63, the AND gates 69 and 71 and the tri-state signal generating unit 85 cooperate to produce the bipolar signals just described is best explained with reference to the diagram of the various signals in FIGS. 2a–2c.

Refer first to FIG. 2a which illustrates the command phase signal F occurring in phase with feedback wave C, i.e., coincidentally with the negative-going zero crossing $C_0$. As the feedback signal C passes through zero in a positive direction, the signal G becomes positive and goes to the binary "0" level. At the same time the flip-flop 63 is reset and its H output signal rises to a binary "0" level. Since the signal G is connected to the AND gate 71 and the signal H is connected to the AND gate 69, both gates are closed even though at their other inputs they are enabled by $\bar{G}$ (in case of the AND gate 69) and by $\bar{H}$ (in the case of AND gate 71). When the command phase pulse F appears (lagging the reference wave crossing $B_0$ by an angle $\phi_{1a}$) it sets the flip-flop 63, thereby making H=1 and $\bar{H}$=0. However, it is assumed that under the conditions illustrated by FIG. 2a that the feedback signal C also lags the reference wave B by an equal angle $\phi_{2a}$, i.e., that the commanded instantaneous position of the element 11 (FIG. 1) equals the actual position so that the command phase angle $\phi_{1a}$ and the actual position feedback phase angle $\phi_{2a}$ are equal. Under these conditions with no phase error ($\phi_{1a}-\phi_{2a}=0$), the flip-flop 63 sets in response to a command phase pulse F, the feedback wave C simultaneously begins a negative half cycle, and the output of the square wave shaper 65 makes G=1 and $\bar{G}$=0. Thus, neither of the AND gates 69, 71 is opened, and the tri-state signal generator 85 remains in its off state. The signal across the resistor 77 remains zero, as indicated at P. So long as the phase error remains zero, this condition will continue.

Assume now that compare signal F leads the negative-going zero crossing point $C_0$ of the feedback signal C. FIG. 2b illustrates this condition with $C_0$ lagging a corresponding negative-going zero crossing point $B_0$ of the reference signal B by an angle $\phi_{2b}$ and with the compare signal F lagging behind the point $B_0$ by a smaller angle $\phi_{1b}$ so that the compare signal F leads the negative-going zero crossing point $C_0$ of the feedback signal C by $+\phi_{1b}-\phi_{2b}=-\Delta\phi_b$. At some instant before the signal $\bar{G}$ goes to the binary "0" level, the compare signal F sets the flip-flop 63 to its "1" state and causes its output signal H, received by AND gate 69, to drop to the binary "1" level. Since the other input $\bar{G}$ of the AND gate 69 is already at binary "1" level, the AND gate opens, and produces a signal I which turns on the negative current generator 73. The AND gate 69 remains open and the generator 85 maintains the signal across the resistor 77 so long as the signals $\bar{G}$ and H remain at their binary "1" levels, that is while the feedback signal C is in a positive half cycle and the flip-flop 63 is concurrently in its "1" state. This condition terminates with the negative-going zero crossing $C_0$ of feedback signal C which causes the signal $\bar{G}$ to rise to its binary "0" level.

Thus, with the compare signal F leading the negative-going zero crossing point $C_0$ of the feedback signal C, a negative signal shown at K in FIG. 2b, is generated during a period which begins with the compare signal F and which ends with the next negative-going zero crossing of the feedback signal C. As a result, the time interval during which the negative signal K exists during each cycle of the reference wave is directly related to the magnitude of the error phase angle $\Delta\phi_b$.

Let it be assumed next that the compare signal F lags behind the same arbitrary point $C_0$ of the feedback signal C. This condition is illustrated in FIG. 2c where the negative-going zero crossing point $C_0$ of the feedback signal C is shown to lead the negative-going zero crossing point $B_0$ of the reference signal B by an angle $\phi_{2c}$ and where the compare signal F is shown to lag the crossing point $B_0$ by an angle $\phi_{1c}$. Thus the total phase difference $\Delta\phi_c$ between the point $C_0$ of the feedback signal C and the compare signal F is $\phi_{1c}+\phi_{2c}$. In other words, the phase error is $$\phi_1-\phi_2=+\phi_{1c}-(-\phi_{2c})=+\Delta\phi_c$$

with the command phase lagging the actual position phase.

During the initial portion of the positive half cycle of the feedback signal C the AND gate 69 is closed because the flip-flop output signal H is "0," and the AND gate 71 is closed because the square wave shaper output signal G is "0." With the negative-going zero crossing point $C_0$ of the feedback signal C leading the compare signal F by an angle $\Delta\phi_c$, the feedback signal C reverses the binary levels of the square wave shaper output signals G and $\overline{G}$ some time before the occurrence of the compare signal F. In particular, at the instant when the feedback signal C crosses zero, the signal G drops to a binary "1" level. Since the flip-flop output signal $\overline{H}$, fed to the other input of the AND gate 71, is already at binary "1" level (the flip-flop 63 having been reset when the feedback signal C went through its positive zero-crossing point) the AND gate 71 is opened. Opening of the AND gate 71 in turn produces a signal J at its output which turns on the positive current generator 75 and creates a positive signal L across the resistor 77.

The AND gate remains open and the generator 75 continues to produce a positive signal across the resistor 77 so long as the signals G and $\overline{H}$ remain at their binary "1" levels, that is, while the feedback signal C is in its negative half cycle and the flip-flop is concurrently in its "0" state. This set of conditions ends with the occurrence of the compare signal F which sets the flip-flop 63 into its "1" state causing the signal $\overline{H}$ to return to its binary "0" level, thereby closing the AND gate 71. Thus a positive signal, shown at L in FIG. 2c generated during a period which commences with the negative-going zero crossing of the feedback signal C and ends with the occurrence of the compare signal F. It will be observed that the time duration of the signal L corresponds to the magnitude of the phase error $\Delta\phi_c$.

As the movable element 11 is being translated, the compare signal F representing the desired position and rate of change of position of the element 11 will lead or lag the negative-going zero crossing point $C_0$ of the feedback signal C through several cycles, depending upon whether the element is being driven in the $+x$ or $-x$ direction. To convert the variable width, constant amplitude pulses K or L into a smoothly variable control signal, e.g., a polarized variable DC voltage suitable for application to a servoamplifier and thence to the servomotor 13, they are averaged by an integrator 87 which may be simply a low pass filter. The output of the low pass filter 87 is thus a polarized DC signal representative of the sense and magnitude of the average error phase angle between the compare signal F and the negative-going zero crossing $C_0$ of the feedback signal C over several cycles. After amplification by the servoamplifier 19, the DC error signal is applied to the servo motor 13 causing it to drive the movable element 11 in a direction and at a velocity which conforms with the direction and rate of change in the phase of the compare pulse F, that is, in a sense and at a rate directed by the contouring director 41. As soon as the phase angle of the command phase pulse F begins to change, and the error phase angle departs from zero, the servo motor 13 begins to move, so that the phase of the feedback signal C is shifted by the resolver 27 in a direction to restore the error phase angle to zero. Thus, the instantaneous position error cannot exceed .05" and the single fine resolver 27 is sufficient to keep the system tracking the dynamically changing directed position. It is for this reason that the command number may be signalled only by the last three digit places thereof (i.e., by the three decade register 57) even though the command number in actual fact may be larger than 999.

In the foregoing description certain assumptions have been made and the system described on the basis of these assumptions for the sake of simplicity. Some of these assumptions are arbitrary, and it will be understood that circuit connections or signal polarities may be reversed and the system operation modified accordingly. For example, the flip-flop 63 has been described as being reset at the instant of positive-going zero crossing by the feedback signal C and set in response to the compare signal F. Yet, it is apparent that the phase error signalling system would be equally effective if the flip-flop were set, instead of reset, at the positive-going zero crossing of the feedback signal C and reset, instead of set, in response to the compare signal F. To compensate for the resulting reversal in the logic levels of the flip-flop output signals, the connections of the flip-flop output terminals "1" and "0" would also be reversed so as to apply the signal H to the AND gate 71 and the signal $\overline{H}$ to the AND gate 69.

Further, in describing the system it has also been assumed that the phase of the reference wave B is such that its positive half cycle occurs during the first half of the cycle of the cycling counter 23 and that its negative half cycle occurs during the second half cycle of the counter. However, this could be reversed, and the phase of the feedback signal C could be shifted 180° (relative to that reference wave) from that shown in FIGS. 2a–2c by reversing the connection of the sine wave shaper 25 to the resolver rotor winding 33. The system would then function in the same manner described.

Further, if only the feedback wave C were reversed in phase by 180° relative to that shown in FIGS. 2a–c (for example, by reversing the input connections to the resolver winding 33), the zero phase error condition would obtain when the command phase pulses F coincide with the positive-going zero crossings (rather than negative-going crossings) of the feedback wave C. Such reversal could be compensated for by merely reversing the connections from the G and $\overline{G}$ outputs of the square wave shaper. This illustrates the fact that negative or positive-going zero crossings may be used as reference instants, this being a matter of choice.

As a final example, if the counter 23 is arranged to repeatedly count down (instead of up as previously described) the command phase angle $\phi_1$ of the compare pulses F will lag or lead the mid-point $B_0$ of the reference wave when the command number is respectively less than or greater than the mid-point value (e.g., 500) of the reference number. This reversal may be compensated for by reversing the direction in which the resolver rotor is driven relative to the direction of rotation of the lead screw.

(B) The reasons for and consequences of "leapfrogging"

Figure 1B:
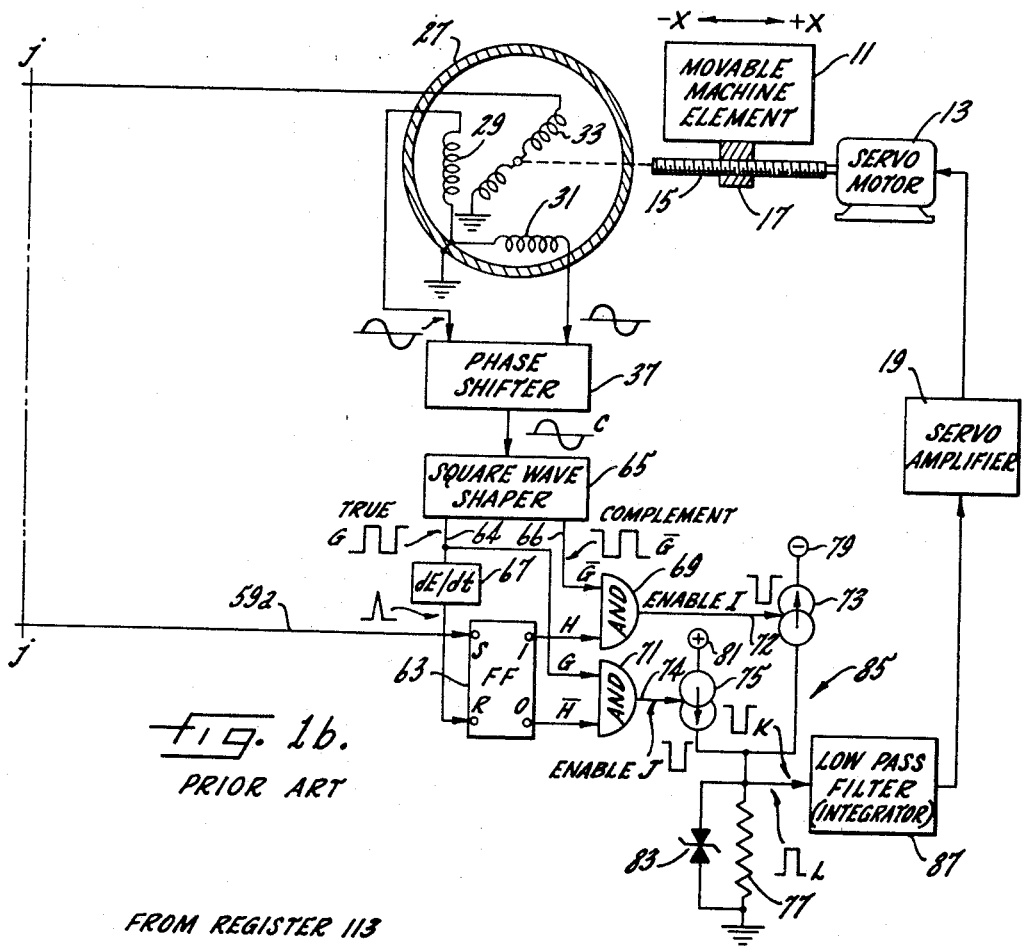

With apparatus as shown in FIGS. 1a and 1b, it is possible under certain circumstances that the compare pulse F will simply not appear, i.e., will be "missed" during some cycles of the reference wave B and the counter 23. This can happen when the updating causes the command number to jump or "leapfrog" from a first value which the reference number reaches subsequent to such updating to a second value which the reference number passed through prior to updating in any given counter cycle.

FIG. 5 illustrates the operation of the apparatus when the command number in the reversible counter 49 is continuously decreasing, and so that the command number E in the storage register 57 is "updated" or stepped to progressively smaller values at update instants $t_u$ during each cycle of the reference wave B and each cycle of the reference number as represented at D. As noted above, it is assumed that the update instants $t_u$ occur each time the reference number passes through a value of 250.

Referring to the first cycle of operation depicted as Case I in FIG. 5, if the command number E both prior to and after the update instant $t_u$ is greater than 250 (e.g., has the respective values of 270 and 260), then the reference number D will not become equal to the command number E prior to updating, but the two will become equal after updating. Under these circumstances, a compare pulse F will be produced with proper phase at some point in time subsequent to the update instant within the illustrated cycle of the reference number. As here shown merely by way of example, the compare pulse F appears at the instant illustrated by intersection $i_1$ indicating that the updated command number and the reference number are both 260.

Consider next the circumstances of Case II depicted in FIG. 5. In this cycle of the reference number, the command number E has a first value (e.g., 260) which is greater than the value (250) of the reference number D at the update instant, but a second value (e.g., 240) which is less than the value (250) of the reference number at the update instant. Thus, the two numbers do not become equal either before or after the update instant $t_u$, and the comparing device 59 (FIG. 1a) does not produce a compare pulse F. The "missed" or absent compare pulse F is shown by a dotted line, and its absence results from the fact that when updating occurs the command number "leapfrogs" from a first value greater than the reference number value (250) at the update instant $t_u$ to a second value less than the reference number value (250) at the update instant $t_u$.

By contrast, a third set of circumstances depicted as Case III in FIG. 5 will not result in missing a compare pulse, because no leapfrogging occurs. If, as shown, the command number is updated from a first value (e.g., 240) to a second value (e.g., 230) which are both less than the update instant value (e.g., 250) of the reference number, then an equal comparison will occur at some instant $i_2$ prior to the update instant $t_u$, and a compare pulse F will be produced with proper phase.

The three cases illustrated in FIG. 5 need not occur in direct succession as there illustrated, and the several signal relationships have been purposely exaggerated in that figure to facilitate explanation. Yet, it will be apparent that when the command number E is progressively reduced by updating, the apparatus of FIGS. 1a and 1b will normally produce negative polarity error voltage pulses K across the resistor 77, and unless the feedback signal C catches up quickly, these pulses will be of successively greater width. The adverse consequences of "leapfrogging" are thus shown by Case II in FIG. 5, because here the absence of the compare pulse leaves the flip-flop 63 in its reset state, the $\overline{H}$ signal erroneously remains at a "1" level, and the current generator 75 produces an error voltage pulse L which is both unduly long in duration and of the wrong, positive polarity. The smooth output voltage from the filter 87 will thus have a momentary positive-going ripple in it which will momentarily reduce the velocity at which the servo motor 13 drives the movable element 17 toward the left. Such a "bump" in the servo drive action will momentarily destroy the coordination of velocities of several machine tool elements along their respective axes. Although such a "bump" in the servo drive action may be tolerable in many applications, it may result in undesirable marking or deforming of the desired surface on a workpiece being machined in a numerically controlled machine tool.

In the conception of the improvement next to be described, it has been recognized that "leapfrogging" will occur in any given cycle of the reference number if the updating of the command number causes it to change from (1) a first value falling outside the range of values traversed by the reference number prior to the updating instant to (2) a second value failing within that range. In the example of Case II in FIG. 5, the reference number increases through the range of 000 to 250 prior to the instant $t_u$, and the command number is updated from first to second values (260 to 240) which respectively lie out of and within that range. If the second value falls outside such range, the compare pulse will not be missed (Case I); but even if the second value falls within such range, the compare pulse will not be missed if the first value also falls within such range (Case III).

These recognitions hold true irrespective of the particular value of the reference number chosen to signal the update instant. As an example, such value has here been described as 250, but any other value may be used. Moreover, these recognitions apply regardless of the direction chosen for cycling by the counter 23, i.e., regardless of whether it repeatedly counts up or counts down. Merely by way of example, if the counter 23 were constructed to repeatedly count down from a value of 999 at the beginning of each cycle of the reference wave to a value of 000 at the end of each cycle, and if updating were caused to take place at the instant the reference number is 300, then a compare pulse would be missed in any cycle wherein the command number is updated by increasing its value from less than 300 to more than 300. Thus, it should be kept in mind that the reference number at the instant of updating may be chosen to have any value, and the direction (up or down) of repeated cycling of the command number is a matter of choice. The "leapfrogging," missing of compare pulses, and the temporary "bump" or inaccuracy of the servo velocity may occur, however, whenever the command number E is changed at the instant of updating from first to second values which respectively lie out of and within the range of values traversed by the reference number in any given cycle prior to the updating instant.

"Leapfrogging" cannot occur when the command number at a given update instant is changed in the same direction that the reference number is continuously changing. That is, if the reference number cyclically increases (as above described, because the counter 23 repeatedly counts up from 000 to 999), and if the command number prior to the update instant is less than the reference number value (e.g., 250) at the update instant, a compare pulse will appear prior to the instant—regardless of whether the command number is increased or decreased as a result of updating. But if the command number is greater than the update reference number value prior to the update instant, and is further increased as a result of updating, a compare pulse will appear subsequent to the update instant in that particular cycle. Thus, if the counter 23 "counts up" to signal the cycling reference number, and the command number is increased when updated in any cycle, no leapfrogging can transpire. Conversely, if the counter 23 "counts down" to signal the cycling reference number, and the command number is decreased when updated in any given cycle, no leapfrogging can occur.

(C) Exemplary embodiments of the invention

In accordance with the present invention, the adverse effects of missing pulses in the phase-variable train of compare pulses are obviated by injecting a substitute pulse into that train in lieu of a missing pulse and with approximately correct timing. To accomplish this, means are provided to sense and signal when, in any given cycle of the reference number, the command number will have, after updating, a value which falls within the range of values traversed by the reference number prior to the update instant. Further, there are provided means responsive to such signalling for producing a substitute signal or pulse at approximately the instant of updating in such cycle, and for causing the apparatus to respond to the substitute pulse in the same manner that it responds to a regular compare pulse. Moreover, the apparatus is arranged such that in any cycle of the reference number during which a compare pulse and a substitute pulse both appear, the substitute pulse becomes redundant and produces no separate response.

Figure 3B:
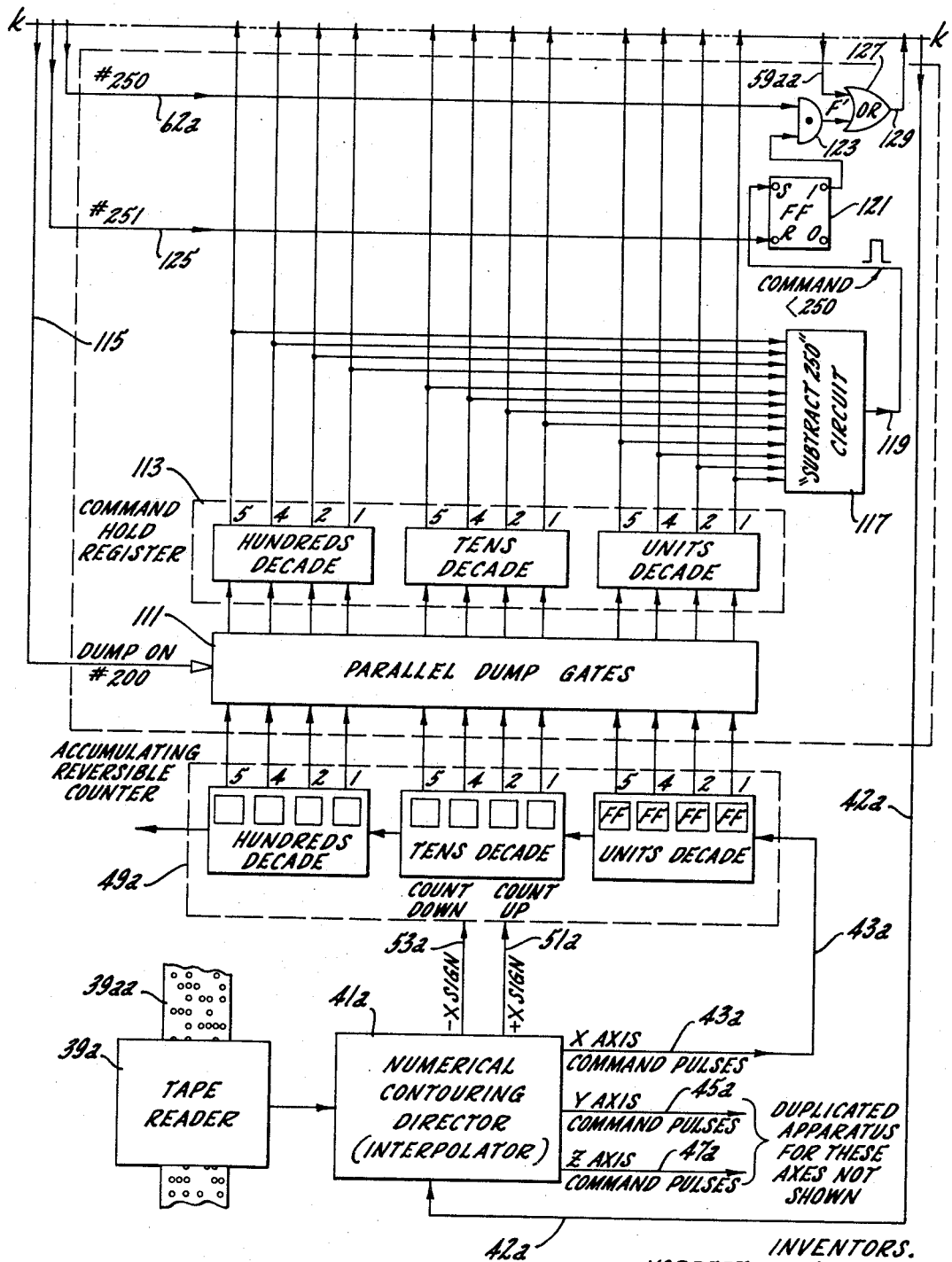

The apparatus embodying the present invention is shown in FIGS. 3a–b, and those parts which correspond to like parts in FIGS. 1a and 1b are identified by the same reference numerals to which the distinguishing suffix $a$ is added. It will be seen from inspection that many of the components employed in the prior art apparatus of FIGS. 1a and 1b are also used in the embodiment of the invention shown by FIGS. 3a–3b. Accordingly, such common parts and their basic operation will not be re-described here.

For reasons to be explained below, it is desirable in the preferred embodiment of the invention to make any substitute pulses occur at the update instants. In order to provide the necessary lead time within which to determine whether a substitute pulse is required in any given cycle, the command number in the reversible counter 49a (and which is to be dumped into the storage register 57a as the next updated value) is taken from the reversible counter 49a a short time before the update instant. Between the "sampling" instant, when the command number is taken from the reversible counter 49a, and the "update" instant, when the command number is transferred into the storage register 57a, the sample command number is temporarily stored. Means for sampling and temporarily storing the command number present in the reversible counter 49a at a particular sampling instant are represented in FIG. 3b by a set of parallel dump gates 111 and a command hold register 113 which, for sake of simplicity in description, may be of the same construction as the parallel dump gates 55a and the updated storage register 57a, respectively. The dump gates 111 are connected between the output terminals of the reversible counter 49a and the input terminals of the command hold register 113. The output terminals of the register 113 are in turn connected to the inputs of the dump gates 55a.

In carrying out the invention, an enabling dump signal is applied, prior to each updating of the storage register 57a, to the parallel gates 111 via line 115 so as to transfer the command number signalled at the outputs of the reversible counter 49a into the command hold register 113. The dump signal may be readily derived from the decoder 61a which for this purpose may include coincidence gates having their inputs connected to output lines of the cycling counter 23 so as to produce a dump signal when the reference number D reaches a predetermined value which occurs during each cycle some time before the update instant.

As in the system of FIGS. 1a and 1b, so also in the improved system of FIGS. 3a and 3b, updating of the storage register 57a is shown by way of specific example to occur when the reference number D passes through a predetermined value of 250. Updating is accomplished by applying a dump signal to the parallel dump gates 55a through the line 62a. But since the hold register 113 is interposed between the reversible counter 49a and the dump gates 55a, the value to which the command number in the register 57a is updated is the number previously and temporarily stored in the hold register 113. Since the storage register 57a is updated when the reference number is at value 250, sampling of the accumulating reversible counter by means of the parallel dump gates 111 is shown merely by way of example to take place when the value of the reference number D is 200, thus providing a lead period corresponding to the time taken by the reference number D to increase by 50.

The purpose of temporarily storing the updated command number is to permit calculating equipment to determine, prior to the update instant in each cycle, whether or not a substitute compare signal should be produced. Thus, the predetermined value (e.g., 200) of the reference number D at which the dump signal for the parallel gates 111 occurs is chosen so that the lead period equals or exceeds the period which the fast-acting calculating equipment will require to make this determination. It will be apparent then, that the timing of the dump signal for the gates 111 may be either retarded or advanced relative to the dump instant if the time required by the calculating equipment to make a determination is shorter or longer, respectively.

It should also be noted that neither of the dump signals on lines 62a and 115 need be derived from a decoder connected to the cycling counter 23a, since, as an equivalent, a separate counter operated in synchronism with the basic pulse source 21a could be employed. Nevertheless, use of signals produced by the cycling counter 23a to control the decoder 61a and thus to time the feeding of data to the registers 113 and 57a form part of the preferred embodiment of the invention. In this respect, keeping in mind that the reference number cyclically changes from a first to a second predetermined value (here 000 to 999), the decoder 61a together with the gates 111 constitute a preferred form of several alternative means for applying the contents of the reversible counter 49a to the command hold register 113 at the instants the reference number passes through a third predetermined value (here, 200). Similarly, the decoder 61a and the dump gates 55a are representative of various equivalent means for transferring into the storage register 57a the updated value of the command number stored in the command hold register 113 at the instants the reference number passes through a fourth predetermined value (here, 250).

In carrying out the invention, means are also provided to determine whether the command number that is to be next transferred into the storage register 57a so as to update it, falls within the range of values traversed by the changing reference number prior to the update instant in each cycle of the reference number. Since the new value of the command number that is to be dumped into the storage register 57a at updating is signalled on the output lines of the command hold register 113 during the time interval between the instant of sampling the reversible counter 49a and the instant of updating the storage register 57a, the output of the command hold register 113 during this period is used to make the determination.

In the embodiments illustrated in FIGS. 1a–b and 3a–b, it has been assumed that the reference number D increases from a minimum number (000) to a maximum number (999) during each of its successive cycles. Since it has also been assumed that updating of the storage register 57a occurs when the reference number D has a value of 250, the determination that is to be made while the command number is in the command register 113 is, more simply stated, whether or not the value of the command number is less than 250, since the reference number traverses the range of values 000 to 249 prior to the update instant in each cycle of the reference number.

In the arrangement here illustrated, this is accomplished by means which subtract 250 from the value which the command number will have after updating in each cycle, and to produce a logic signal if the remainder is negative. Such signalling of a negative remainder indicates that the command number, the minuend, is less than 250, the subtrahend. A device for performing such a subtracting operation is indicated as the block 117 and has a set of input lines, each connected to one of the output lines of the command hold register 113 for receiving signals representing the value of the new command number stored therein.

The device 117, designated in FIG. 3b as a "Subtract 250 Circuit," may be either a special purpose computing device for the sole purpose of subtracting 250 from the command number in the hold register 113, or it may be a time-shared multipurpose calculator or computer, one of whose functions is to perform the subtracting operation but which performs other computing functions as well. In the latter case, the memory banks of the calculator or computer may themselves perform the function here ascribed to the hold register 113. Since this type of equipment is well known to those skilled in the art it will not be described in further detail here. It is sufficient to say that the result of the subtracting operation is manifested by a response signal on the output line 119 of the device 117 which is produced only if the sampled command number is less than 250.

If the device 117 is a time-shared multi-purpose calculator, it will be cleared (by means not shown) after it has executed the subtraction of 250 from the command number in order that it will be able to perform other calculations. Accordingly, any output pulse on line 119 of the subtract circuit 117 is temporarily stored in a suitable storage device, here illustrated as a bistable flip-flop 121 with its set input connected to the output line 119. The flip-flop 121 is normally in the reset state in which its "1" output is at binary "0" level. In response to a signal from the device 117, produced when command number in the hold register 113 is less than 250, flip-flop 121 is set and its "1" output terminal goes to the binary "1" level.

Depending upon the time taken by the device 117 to determine whether the sampled command number stored in register 113 is less than 250, the flip-flop 121 will produce a binary logic level signal at its "1" output some time before the register 57a is updated. As a further feature of the preferred form of the invention, means are provided which, in response to a logic signal formed by the device 117 and stored in the flip-flop 121, produce a substitute compare signal at the instant of updating, i.e., at the instant the reference number is passing through the fourth predetermined value (here, 250).

For this purpose, the output of the flip-flop 121 is applied to one input of an AND gate 123 whose other input is connected to the line 62a which receives a dump signal from the decoder 61a at the update instant. Accordingly, during those cycles of the reference number D in which the value of the command number in the register 113 is within the range calling for production of a substitute command signal, a signal F' will appear at the output of the AND gate 123 at the instant when the storage register 57a is updated, i.e., at the instant the reference number has a value of 250.

Means are also provided for clearing the flip-flop 121 after its output has been gated through the gate 123. In the illustrated embodiment this is accomplished by a pulse produced through the decoder 61a at the instant the number in the cycling counter is 251. This latter decoder output pulse is applied to the reset input R of the flip-flop 121 via line 125. Although a flip-flop has been used as a means for termporarily storing the signal produced by the subtracting circuit 117, any of a variety of known equivalent storage devices may be employed. Also, the signal for opening the AND gate 123 need not be derived from the cycling counter, although this arrangement is the most convenient one for insuring that the gating signal will have a constant phase relationship with the cycling reference number D. Similarly, if it were desired to produce a substitute compare pulse at some instant other than that at which updating occurs, the AND gate 123 could be opened when the number in the counter 23a has a value other 250. Thus, the flip-flop 121, the AND gate 123 and the decoder 61a in combination comprise merely an exemplary means which, in response to a signal produced by the subtracting device 117, will produce a substitute compare signal F' at any desired instant during the cycle of a reference number which in the illustrated embodiment is chosen to occur at the instant when updating of the storage register 57a is effected.

As a suitable arrangement for injecting or interleaving the substitute signals F' produced during any given cycle of the reference number D with the compare signals normally produced in the absense of "leapfrogging," the compare pulses F (on the output line 59aa of the comparing deivce 59a) and the substitute pulses F' (passed through the gate 123) are supplied as inputs to an OR circuit 127. The output line 129 of this OR circuit leads to the set input terminal of the flip-flop 63a, and the latter responds to the pulses F, and to any substitute pulses F', as explained hereinafter.

(C1) A modified form of apparatus

Figure 4:
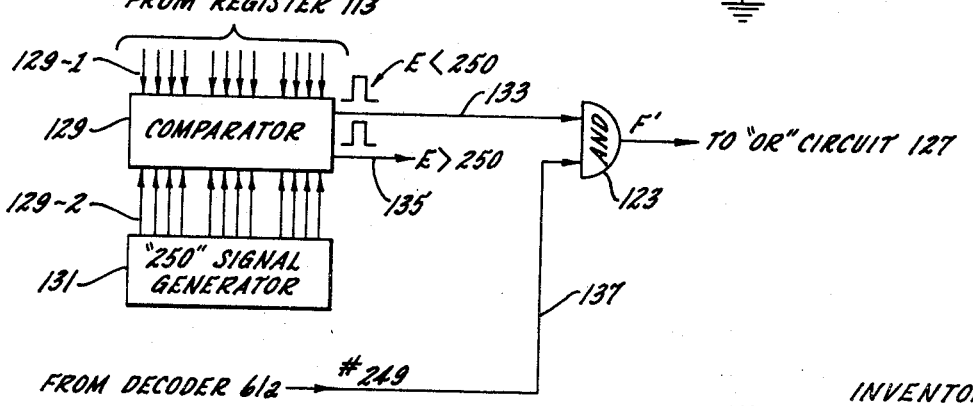
FIG. 4 is a block diagram of a modification of the system shown in FIGS. 3a and 3b, employing a comparator in lieu of a substracting circuit.

FIG. 4 illustrates a modified embodiment of the invention. It indicates that as one typical equivalent for determining whether or not the updated command number is less than the value (here, 250) of the reference number at the update instant, a "less than"' type comparator may be used. This type of comparator, which is per se well known, produces an output signal when a particular one of two digitally signalled input numbers is less than the other. In lieu of the subtracting device 117, such a comparator 129 (FIG. 4) may have one set of input terminals 129–1 connected to the output lines of the command hold resgiiter 113 and a second set of input terminals 129–2 connected to a "250" signal generator 131. The signal generator 131 produces a set of signals representing the number 250 in the same digital code in which the reversible counter 49a operates and these signals could be maintained permanently on the comparator input terminals 129–2.

During each cycle of the reference number D in which a command number less than 250 is stored in the hold register 113, a signal indicative of this condition appears on the comparator output line 133. It may also be noted that devices of the type contemplated for use as the comparator 129 frequently have an additional output which indicates when a given number signalled at one set of its terminals is greater than another number signalled at a second set of its terminals. Such an output is indicated as the comparator output line 135 in FIG. 4. Accordingly, if a command number whose value is greater than 250 were stored in the command hold register 113, an output indicative of this condition would appear on a comparator output line 135. The utility of this second output line will be pointed out toward the concluding part of this specification.

If a number less than 250 is stored in the command hold register 113, the resulting signal indicative of this condition will remain on the comparator output line 133 at least until the contents of the command hold register 113 are read out to the storage register 57a at the update instant, which in the illustrated embodiment occurs when the value of the reference number is 250. The substitute compare signal may be produced either at the update instant or shortly prior thereto. It may, for example, be produced when the reference number is 245, 246 or 247; but in the preferred form here illustrated it is made to occur at the instant or count which immediately precedes the update instant. Accordingly, in the modified embodiment shown in FIG. 4 (and wherein the update instant is assumed to be that when the reference number is 250), the substitute compare signal is chosen to occur at the instant the reference number value is 249. This is achieved simply by connecting the comparator output line 133 to one input of the AND gate 123 and connecting the other input of the AND gate through a line 137 to an output of the decoder 61a which is arranged to produce a timing signal on the line 137 when the value of the reference number in the cycling counter 23a is 249.

It will be noted that there is no need for a storage device such as a flip-flop between the output of a comparator 129 and the AND gate 123 since the signal of the comparator output line 133 will persist from the instant of sampling (at a reference number value of 200) until the update instant (at a reference number value of 250), so that if it is generated, it exists at the instant when the reference number is at the value of 249. The gated output of the comparator 129, which now forms the substitute compare signal F′, is connected to the OR circuit 127 in the same manner as, and in lieu of, the output of gate 123 as shown in FIG. 3b.

(C2) Summary of operation (FIG. 6)

The train of variable phase signals produced by the improved system of FIGS. 3a–b is shown in FIG. 6 and includes the compare signals F normally produced by the comparing device 59a and the substitute compare signals F′ produced in accordance with the present invention. Under the circmustances of Case I, where the signalled command number has first and second values (270 and 260) before and after updating which are both greater than the fourth predetermined value (250) of the reference number, a compare pulse F is produced in a normal fashion. Thus, under the Case I circumstances (identical for FIGS. 5 and 6), the prior apparatus of FIGS. 1a–b and the improved apparatus of FIGS. 3a–b both provide the same operational result.

In the Case II operation depicted by FIG. 6, however, as the reference number reaches the sampling value (200) at a sampling instant $s_u$, the next value (240) of the command number is transferred into the hold register 113. Because that value is less than 250, a signal so indicating appears on the output line 119 of the subtracting device 117 and sets the flip-flop 121. Then, at the update instant $t_u$ (when the reference number reaches 250), the command number E in the register 57a is updated and decreased to 240. But simultaneously, a signal on line 62a from the decoder is applied to the AND gate 123 and because the latter is enabled by the output of flip-flop 121, a substitute pulse F′ is passed through the OR circuit 127. Thus, even though the regular compare pulse F is missed due to "leapfrogging," the flip-flop 63a is nevertheless set by the substitute pulse F′.

It will be noted that the substitute signal F′ produced by the preferred embodiment of the improved system occurs at the update instant $t_u$ during the illustrated cycle of the reference number D, a cycle in which the command number E is changed upon updating from a first to a second value (260 to 240), the latter of which lies within the span of values traversed by the reference number prior to the update instant $t_u$. The phase error ΔF between the time of occurrence of the substitute signal F′ and the instant when the missed compare signal F should have occurred is slight and represents the time taken by the reference number to advance from the new value (240) which the command number E has after updating to the value (250) which the reference number has at the update instant $t_u$. In most instances the value of the command number E following a "leapfrog" jump through the value (250) of the reference number D at the update instant $t_u$ will be very close to that latter value and consequently the phase error ΔF between the proper instant for a compare signal F and the actual instant of occurrence of the substitute signal F′ will be quite small. For all intents and purposes, such a small error will be undetectable in the operation of the servomotor 13a, because the output signal from the filter 87a will smoothly vary without having a "bump" in it.

In the third cycle of operation shown by FIG. 6, a compare signal F is generated, i.e., there is no "miss." Although the substitute signal F′ is also produced, it occurs after the compare signal F and will have no effect on the rest of the system, as pointed out below. Thus, the improved digital-to-phase-analog signal converter of the present invention is capable of producing a train of compare signals and substitute signals interleaved to replace "misses," the phase of such signals relative to the reference wave B accurately representing a digitally signalled dynamically changing command number regardless of any "leapfrogging."

Since the apparatus illustrated in FIG. 1b is identical to that shown in the corresponding portion of FIG. 3a, the operation of the improved system in response to the reference signal B, the feedback signal C, and the compare signals F will not be repeated. Instead, the difference in the operation of the system resulting from the presence of a substitute signal F′ produced according to the present invention will be demonstrated by comparing FIGS. 5 and 6 which represent identical sets of circumstances in Cases I, II and III. Thus, the reference wave B and the reference and command numbers D and E during the three cycles depicted in FIG. 6 are the same as those shown in FIG. 5. FIG. 6 differs from FIG. 5 only in its showing of a substitute compare signal F′ (Cases II and III) and in the resulting wave shapes produced by the closed loop control system of FIG. 3a as a result of the presence of the substitute compare signal F′. The operation for the first cycle illustrated as Case I in FIG. 6 is the same as that shown in FIG. 5 including the wave forms G, $\overline{G}$, H, $\overline{H}$, I and K. This is also because in the first cycle shown in FIGS. 5 and 6 the command number E has not changed to a value below that of the reference number D at the instant of updating $t_u$ so that a normal compare signal F is generated, and no substitute pulse F′ appears. Now observe the wave forms generated by the improved system during the second cycle of the reference number D (Case II) shown in FIG. 6 and compare this with the corresponding wave forms shown in FIG. 5. From the earlier discussion of these wave forms it will be recalled that an error signal L which is of the incorrect polarity is produced due to the failure of the output signal $\overline{H}$ of the flip-flop 63 (FIG. 1b) to be returned to its binary "0" level by a compare signal F, since no such compare signal was produced during the second cycle shown in FIG. 5. This failure of the signal $\overline{H}$ to return to binary "0" level results in the enabling of AND gate 71 by the signals $G \cdot \overline{H}$ which remain concurrently at the binary "1" level during a substantial portion of the second cycle. Enabling of the AND gate 71 turns on signal generator 75 for a correspondingly long period, resulting in the production of a positively poled error signal L in place of a negatively-poled error signal K which would have been produced by the system if it had not "missed" a compare pulse.

Under the same circumstances which gave rise to the incorrect error signal L shown in FIG. 5, the improved system of the present invention produces an error signal K which is of the proper polarity and whose time duration is only slightly different from what it would have been had a normal compare pulse F been produced. This is seen from the waveshape of the signal $\overline{H}$ during the second cycle of the reference number D shown in FIG. 6. Instead of remaining at a binary "1" level as in FIG. 5, the signal $\overline{H}$ is returned to a binary "0" level coincidentally with the occurrence of the substitute compare pulse F′ which sets the flip-flop 63a. Instead of flip-flop remaining reset due to the absence of a compare pulse F, the flip-flop is set by the substitute pulse F′.

Furthermore, the waveform of the output signal H of the flip-flop 63a (FIG. 3a) changes from a binary "0" to a binary "1" level while the signal $\overline{G}$, produced by the square wave shaper 65a is still at its binary "1" level. Consequently, due to the concurrent presence of the signals $\overline{G}$ and H at their binary "1" levels, the AND gate 69a is opened, and remains open, until the signal $\overline{G}$ returns to its binary "0" level at the instant when the feedback signal C next crosses zero. Consequently, the opened AND gate 69a produces an enabling signal I which turns on the current generator 73a to produce a negative error signal K across the resistor 77a. Thus, by means of the substitute compare signal F′ not only has the untimely opening of the AND gate 71a and the enabling of the current generator 75a been prevented but, in addition, the AND gate 69a which in the absence of a compare signal F remained closed, has been opened and as a result current generator 73a has been turned on.

The waveforms for Case III in FIG. 6 demonstrate the manner in which the improved system of the present invention operates during a cycle of the reference number D in which both a normal compare signal F and a substitute compare signal F' are produced. During the third illustrated cycle the compare signal F appears since the value of the command number E prior to its updating is less than the value of the reference number D at updating. With the reference number D increasing in value during its cycle, the two become equal at the instant $i_2$ and prior to the instant of updating $t_u$, causing a normal compare signal F to be produced by the comparing device 59a. According to its normal manner of operation, therefore, the flip-flop 63a is set by the compare signal F causing the signals H and $\overline{H}$ to go to their binary "1" level and binary "0" level respectively. This change in the logic level of the signal H causes the AND gate 69a to open and to produce an enabling signal I which then turns on the current generator 73a to produce a negative error signal K in the manner described in connection with the second cycle shown in FIG. 6.

Although a normal compare pulse F is thus produced in the Case III cycle of the reference number D illustrated in FIG. 6, nevertheless a substitute compare pulse F' is also generated at the instant when the command E is updated. However, the substitute compare signal F' follows in time the normal compare signal F since that pulse resulted from equality of the command number E and the reference number D at an instant which preceded the update instant $t_u$. The substitute compare signal F' under these circumstances has no effect on any of the signals because once the flip-flop 63a is set by the normal compare signal F, a subsequent signal F' applied to its Set terminal, merely leaves the flip-flop in the set state. The flip-flop resets at the instant the feedback signal C crosses zero in a positive-going direction and the G signal switches to a binary "0" level. Stated differently the flip-flop 63a is responsive only to the first in time of the compare and substitute compare signals. Of course, if the two signals coincide then, so far as the flip-flop is concerned they are both "first in time" and the flip-flop will respond to both signals at the instant of the occurrence. This is the sense in which the term "first in time" is used in the appended claims.

Since the flip-flop 63a responds only to the "first in time" of the signals F and F', and since the signal F' is made either to coincide with or to follow the signal F during those cycles of the reference number D in which they are both produced, it follows that, during such cycles, the substitute signal F' has no effect upon and cannot alter the instant when the flip-flop 63a is triggered. Viewed in a general sense, it may be said that the compare signal F and the substitute signal F' (either or both of which may appear during each cycle of the reference number) form a composite, phase variable analog signal on the conductor 129 (FIG. 3) which varies in phase relative to the reference number cycle substantially according to changes in the value of the command number, and free of discontinuities which might otherwise occur due to missing of a compare pulse.

From the foregoing, it will now be understood that both normal compare signal F and a substitute signal F' may appear under Case III conditions, i.e., when in any given cycle the command number E is updated from first to second values (e.g., 240 to 230) which both lie in the range traversed by the reference number prior to updating. So long as the normal compare signal F precedes or coincides with the substitute signal F' only the former produces any effect. The latest instant at which a normal compare signal F can occur under these conditions is the instant that the reference number passes through the value 249. Thus, in the preferred forms of the invention, the substitute signals F' are gated to appear either at the instant that the reference number immediately precedes its value at the update instant or has its update instant value. In the examples here described, the substitute pulses F' appear at the instant the reference number is 249 (FIG. 4) or 250 (FIGS. 3a–b), the reference number being 250 at the update instant.

Although the appearance of substitute signals is preferably timed to be no earlier than the latest normal compare pulse which can occur prior to updating in any given cycle, it is not essential that the substitute signals appear exactly at the update instant. For example, in the arrangement of FIGS. 3a–b, the AND gate 123 could be enabled by a decoder output signal when the reference number reaches 255 or 256—some five or six counts after updating at the count of 250. The flip-flop would be reset subsequent to this. Nevertheless, it is preferred to cause any substitute signals F' to appear either coincidentally with or approximately at the update instant, since this minimizes the small error ΔF.

In the foregoing description of a preferred embodiment of the invention, an improved system of the type wherein a cyclically increasing reference number is used has been described. In such a system, "missing" a compare signal may be predicted and compensated for by detecting an updated command number whose value is less than the value of the reference number at the update instant—and that this can be done simply by subtracting from the updated value of a command number the value which the reference number has at the update instant. This is in keeping with the broader aspects of the invention by which a missing compare pulse is replaced with a substitute pulse if the digitally signalled command number after updating lies within the range of values traversed by the reference number prior to updating in any given cycle.

If, on the other hand, a cyclically decreasing reference number is used in the system, the first condition giving rise to "missing" (that the value of the updated command number lie within the range traversed by the reference number prior to updating) would be met by a command number whose updated value is greater than the value of the reference number at updating. Thus, if the cycling counter 23a of FIG. 3a were modified to produce a cyclically decreasing number, the calculating means exemplified by the subtracting device 117 would also be modified to detect the presence in the hold register 113 of a sampled command number whose value is greater by no more than a predetermined amount than the value of the reference number at the update instant. If a subtracting device were used in such a system, it would subtract the value of the sampled command number in the hold register 113 from the value of the reference number at the update instant and produce a response if the remainder is negative.

Similarly if a comparator were used to determine the magnitude of the updated command number relative to the magnitude of the reference number at the update instant in the manner shown in and described with reference to FIG. 4, the line 135 of the comparator would be connected to the AND gate 123 in place of the output line 133 so that the AND gate would be opened by a gating signal through the line 137 during each cycle of the reference number in which the updated command number is greater, by no more than a predetermined amount, than the value of the reference number at the update instant.

From the foregoing, it will be seen that the improved system here disclosed produces a phase variable output representing the value of its changing digital input command regardless of the direction of change or value of the digital command number. Furthermore, by eliminating the effect of missed compare signals, the system is made uniformly accurate and smooth in operation regardless of the direction of commanded displacements and velocities which the movable element 17 is caused to execute.

We claim as our invention:
1. In a system for converting digitally signalled, numerically represented command information into a phase variable analog signal, such system including
   (a) means for producing first signals digitally representing a reference number which during successive time intervals repeatedly and cyclically changes from a predetermined first value to a predetermined second value by uniform increments at uniformly time spaced instants,
   (b) means for producing second signals digitally representing a command number which falls within the range defined by said first and second predetermined values and which dynamically changes within said range at update instants spaced apart in time no less than the time intervals of the reference number cycles, and
   (c) means responsive to said first and second signals for producing a compare signal at the instants said two signalled numbers are equal, the improvement which comprises
   (d) means for producing a response signal whenever the value of the command number subsequent to the said update instant lies within the range of values traversed by the reference number prior to said update instant during any given cycle of the reference number,
   (e) means responsive to said response signal for producing a substitute signal timed to occur approximately at said update instant, thereby to compensate for the possible missing of a compare signal, and
   (f) means responsive to said compare signals and said substitute signals for forming said phase variable analog signal free from discontinuities resulting from said missing of a compare signal.

2. In a system for converting digitally signalled, numerically represented command information into a phase variable analog signal, such system including:
   (a) means for generating a cyclically recurring reference signal,
   (b) means for producing first signals digitally representing a reference number which during successive time intervals, corresponding to successive cycles of said reference signal, repeatedly and cyclically changes from a predetermined first value to a predetermined second value by uniform increments at uniformly time spaced instants,
   (c) means for producing second signals digitally representing a command number which falls within the range defined by said first and second predetermined values and which dynamically changes within said range at update instants spaced apart in time no less than the period of said reference signal, and
   (d) means responsive to said first and second signals for producing, at the instants said two signalled numbers are equal, a compare signal which thus varies in phase relative to said reference signal according to changes in said command number, the improvement comprising
   (e) means for producing a logic signal when the value of the signalled command number following the update instant during a given time interval falls within the range of values traversed by the reference number during said time interval and prior to said update instant, and
   (f) means responsive to said logic signal and to said first signals for producing a substitute signal no earlier than the time spaced instant which immediately precedes said update instant, and
   (g) means responsive to said compare signals and said substitute signals for forming said phase variable analog signal free from discontinuities which otherwise might occur due to missing of a compare signal.

3. The combination of claim 2 wherein the said means for producing a substitute signal includes means to produce a substitute signal at the instant that the reference number has one of two values, such values being (a) the value which the refernce number has at the update instant and (b) the value which it has immediately preceding said last-named value.

4. In a system for converting digitally signalled, numerically represented command information into an analog phase variation, such system including:
   (a) means for producing first signals digitally representing a reference number which during successive time intervals repeatedly and cyclically changes from a first to a second predetermined value by uniform increments at uniformly time spaced instants,
   (b) a source of second signals which digitally represent a changeable command number,
   (c) comparing means having first and second sets of input terminals for producing a compare signal when the values of two numbers digitally represented by signals applied to the two sets of input terminals are equal, and
   (d) means for applying said first signals to said first set of input terminals, the improvement comprising
   (e) means for temporarily storing the second signals in the form they have at sampling instants spaced apart in time no less than the time interval of the reference number cycles,
   (f) means for transferring the stored second signals to said second input terminals at update instants which occur subsequent to the sampling instants, and
   (g) means for producing a substitute signal whenever the number stored in said temporary storing means lies within the range of values traversed by said reference number prior to the update instant in any cycle of the reference number, said substitute signal thereby being present to compensate for the absence of a compare signal from said comparing means in any cycle of the reference number.

5. The combination of claim 4 wherein said last-named means includes means to produce the substitute signal no earlier than the last time spaced instant prior to said update instant.

6. In a system for converting digitally signalled, numerically represented command information into an analog phase variation, such system including:
   (a) means for producing first signals digitally representing a reference number which during successive time intervals repeatedly and cyclically changes from a first to a second predetermined value by uniform increments at uniformly time spaced instants,
   (b) means for producing second signals digitally representing a changeable command number which falls within the range defined by said first and second predetermined values,
   (c) comparing means having first and second sets of inputs for producing a compare signal when the values of two numbers digitally represented by signals applied to such inputs are equal, and
   (d) means for applying said first signals to said first set of inputs, the improvement comprising
   (e) means for temporarily storing said second signals in the successive forms they have at successive sampling instants which are spaced apart in time no less than the time intervals of the reference number cycles,
   (f) means responsive to the signals stored in said storing means for producing a logic signal when the value of the number represented by such stored signals lies within a predetermined range between said first predetermined value and a predetermined update instant value,
   (g) means for applying the signals stored in said storing means to said second inputs at update instants when the reference number has said predetermined update instant value, said update instants occurring subsequent to said sampling instants within any given cycle of the reference number, and such applying means including means for continuing the application of the signals so applied until the next update instant occurs, so that a compare signal will normally be produced by said comparing means during each cycle of said reference number and variable in phase relative thereto according to the changing value of the signalled command number,
(h) means for producing a timing signal in approximate coincidence with each update instant, and
(i) means responsive to coincident appearance of said timing signal and said logic signal for producing a substitute signal usable in lieu of any compare signal which is missing in the phase-variable succession of compare signals.

7. In a system for converting digitally signalled, numerically represented command information into an a phase variable analog signal, such system including:
(a) a pulse source,
(b) a cycling counter stepped by said source for producing first signals digitally representing a reference number which during successive time intervals repeatedly and cyclically changes from a first to a second predetermined value by uniform increments at uniformly time spaced instants, and
(c) a source of second signals which digitally represent a changeable command number, the improvement comprising
(d) first and second storage registers,
(e) means responsive coincidentally to said first signals representing a reference number of a third predetermined value, intermediate said first and second values, for transferring the output of said source of second signals into said first register,
(f) means responsive coincidentally to said first signals representing a reference number of a fourth predetermined value, intermediate said third and second values, for transferring into said second register signals corresponding to those stored in said first register,
(g) comparing means responsive to said first signals and to signals stored in said second register for producing a compare signal when the numbers represented by such signals are equal,
(h) means responsive to signals in said first register for producing a logic signal when the number represented by such signals is within the range of values transversed by the reference number prior to reaching said fourth predetermined value in each cycle of said counter,
(i) means for temporarily storing said logic signal,
(j) a gate having one input connected to receive said stored logic signal,
(k) means responsive coincidentally to said first signals representing a reference number of a fifth predetermined value for opening said gate to pass said logic signal as a substitute signal, said fifth predetermined value being substantially equal to said fourth predetermined value, and
(l) means responsive to said compare signals and said substitute signals for forming said phase variable analog signal free from discontinuities which might otherwise result from missing of a compare signal during some cycles of said reference number.

8. In a numerical control system wherein a movable element is translated by a servomechanism through distances and at velocities corresponding to numerically defined commands, such system including:
(a) means for producing first signals digitally representing a reference number which during successive time intervals repeatedly and cyclically changes from a first to a second predetermined value by uniform increments at uniformly time spaced instants,
(b) means coupled to said movable element and responsive to its movement for producing a recurring feedback signal indicative by the sense and magnitude of its phase angle, relative to the cycling intervals of the reference number, of the sign and extent of the displacement of the movable element from a datum position,
(c) a source of second signals which digitally represent a command number periodically changed at update instants to represent by its extent, sense and average rate of change the desired extent, direction, and velocity of movement of the element, and
(d) means responsive to said first and second signals for producing repeating compare signals at the instants said two signalled numbers are equal, the improvement comprising
(e) means responsive to said second signals for producing a substitute signal during those cycles of the reference number in which the value of the command number signalled after said update instant lies within a range of values traversed by the reference number prior to said update instant, to compensate for a missed compare signal during such cycles, and
(f) means connected to receive said compare signal, said substitute signal, and said feedback signal for producing a servoactuating error signal proportional in magnitude and corresponding in polarity to the extent and sense of the phase error between the feedback signal and the first in time of said compare and substitute signals.

9. In a numerical control system wherein a movable element is translated through distances and at velocities correspondiing to numerically defined commands, such system including:
(a) means for producing first signals digitally representing a reference number which during successive time intervals repeatedly and cyclically changes from a first to a second predetermined value by uniform increments at uniformly time spaced instants,
(b) means coupled to said movable element and responsive to its movement for producing a recurring feedback signal indicative by the sense and magnitude of its phase angle relative to the cycling intervals of the reference number of the sign and extent of the displacement of the movable element from a datum position,
(c) a source of second signals which digitally represent a changeable command number,
(d) comparing means, having a first set of input terminals connected to receive said first signals and also having a second set of input terminals, for producing a compare signal when the numbers represented by signals applied to the two sets of input terminals are equal,
(e) a bi-state device having stable "0" and "1" states,
(f) means for driving said bi-state device toward its "1" state in response to each of said compare signals,
(g) means for resetting said bi-state device to its "0" state in response to each positive-going zero-crossing of said feedback signal,
(h) means for producing a first error signal having a predetermined magnitude during periods when said bi-state device is in its "1" state and said feedback signal is concurrently in a positive half cycle,
(i) means for producing a second error signal having a predetermined magnitude during periods when said bi-state device is in its "0" state and said feedback signal is concurrently in a negative half cycle, and
(j) means controlled by said first error signal for driving said movable element in one direction and controlled by said second error signal for driving said element in the opposite direction at a velocity corresponding to the average value of the prevailing error signal, the improvement which comprises
(k) means for temporarily storing the second signals representing the command number at sampling instants spaced apart in time no less than the time intervals of the reference number cycles, (l) means for applying said sampled signals to said second set of input terminals at update instants occurring after said sampling instants, so that said comparing means produces a compare signal at each instant the numbers represented by said sampled signals and by said first signals are equal, (m) means responsive to the presence during a given time interval in said temporary storing means of stored signals representing a sampled command number whose value lies in a range traversed by the reference number prior to the update instant in said time interval for producing a substitute signal during said time interval to compensate for the possible missing of a compare pulse during said time interval, and (n) means for driving said bi-state device toward its "1" state in response to each of said substitute signal, thereby to avoid any adverse effect if a compare signal is not missed and to avoid production of the improper one of said two error signals if a compare signal is missed.

10. In a numerical control system wherein a movable element is translated by a servomechanism through distances and at velocities corresponding to numerically defined commands, such system including:

(a) a pulse source, (b) a cycling counter stepped by said source for producing first signals digitally representing a reference number which during successive time intervals repeatedly and cyclically changes from a first to a second predetermined value by uniform increments at uniformly time spaced instants, (c) means coupled to said movable element and responsive to its movement for producing a recurring feedback signal indicative by the sense and magnitude of its phase angle relative to the cycling intervals of the reference number of the sign and extent of the displacement of the movable element from a datum position, and (d) a source of second signals which digitally represent a changeable command number, the improvement comprising (e) first and second storage registers, (f) means responsive coincidentally to said first signals representing a third predetermined value, intermediate said first and second values, for transferring the output of said source of second signals into said first register, (g) means responsive coincidentally to said first signals representing a fourth predetermined value, intermediate said third and second values, for transferring into said second register signals corresponding to those stored in said first register, (h) comparing means responsive to said first signals and to signals stored in said second register for producing a compare signal when the numbers represented by such signals are equal, (i) means responsive to signals from said first register for producing a temporary logic signal when the number represented by such signals is within the range of values traversed by the reference number prior to reaching said fourth predetermined value, (j) means for storing said temporary logic signal, (k) a gate having an input connected to receive said stored logic signal, (l) decoding means responsive coincidentally to said first signals representing a fifth predetermined value for opening said gate to pass said stored logic signal as a substitute signal, said fifth predetermined value being approximately equal to said fourth predetermined value, and (m) means connected to receive said compare signals, said substitute signals and said feedback signal for producing a servoactuating error signal proportional in magnitude and corresponding in polarity to the extent and sense of the phase error between the feedback signal and the first in time of said compare and substitute signals.

11. The combination of claim 10 wherein said means for producing said temporary logic signal includes means for subtracting the said fourth predetermined value from the number held in said first register and for producing said temporary logic signal when the subtrahend exceeds the minuend, and said decoding means includes means for opening said gate either at the instant said first signals represent said fourth value or the value which immediately precedes said fourth value.

References Cited

UNITED STATES PATENTS

| | | | |
|---|---|---|---|
| 3,267,429 | 8/1966 | Strohmeyer | 340—347 X |
| 3,075,189 | 1/1963 | Lisicky | 340—347 X |
| 2,907,021 | 9/1959 | Woods | 340—347 |

MAYNARD R. WILBUR, Primary Examiner

GARY R. EDWARDS, Assistant Examiner